(12) United States Patent
Wakazono et al.

(10) Patent No.: US 7,890,667 B2
(45) Date of Patent: Feb. 15, 2011

(54) PRINTER DEVICE WITH EXTERNAL DISPLAY THAT PROVIDES VISUAL CONFIRMATION OF PRINTER DEVICE ON A NETWORK VIA PING DATA

(75) Inventors: Tomomi Wakazono, Ogaki (JP); Sunao Kawai, Toyoake (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 182 days.

(21) Appl. No.: 11/377,619

(22) Filed: Mar. 17, 2006

(65) Prior Publication Data

US 2006/0230138 A1    Oct. 12, 2006

(30) Foreign Application Priority Data

Mar. 31, 2005    (JP)    ............................. 2005-101378

(51) Int. Cl.
G06F 15/173    (2006.01)
(52) U.S. Cl. ............................. 710/15; 710/17; 710/18; 710/19; 358/1.15; 358/1.18; 709/220; 709/221; 715/716; 715/839
(58) Field of Classification Search ................... 710/15, 710/17–19; 715/716, 839; 709/220, 221, 709/224; 358/1.15, 1.18
See application file for complete search history.

(56) References Cited

U.S. PATENT DOCUMENTS

| | | | | |
|---|---|---|---|---|
| 5,793,366 | A * | 8/1998 | Mano et al. | 715/839 |
| 5,956,025 | A * | 9/1999 | Goulden et al. | 715/716 |
| 6,377,987 | B1 * | 4/2002 | Kracht | 709/220 |
| 6,636,250 | B1 * | 10/2003 | Gasser | 715/853 |
| 7,239,412 | B2 * | 7/2007 | Leslie | 358/1.15 |
| 7,246,109 | B1 * | 7/2007 | Ramaswamy | 707/3 |
| 7,327,482 | B2 * | 2/2008 | Ferlitsch | 358/1.15 |
| 7,433,067 | B2 * | 10/2008 | Nonoyama et al. | 358/1.15 |
| 7,573,604 | B2 * | 8/2009 | Hull et al. | 358/1.8 |
| 7,574,658 | B2 * | 8/2009 | Kisanuki | 715/736 |
| 2006/0064753 | A1 * | 3/2006 | Otake et al. | 726/19 |
| 2007/0024896 | A1 * | 2/2007 | Bounar | 358/1.15 |

FOREIGN PATENT DOCUMENTS

| | | | |
|---|---|---|---|
| EP | 838761 A2 * | 4/1998 | |
| JP | 9-006559 A | 1/1997 | |
| JP | 11-194900 A | 7/1999 | |
| JP | 2001-216241 A | 8/2001 | |

OTHER PUBLICATIONS

Cheryl Walton, iPrint: Access a Printer From Anywhere, Novell, Pages, pp. 1-8.*

JP Office Action dtd Jun. 3, 2008, JP App. 2005-101378 (partial translation).

* cited by examiner

Primary Examiner—Tammara Peyton
(74) Attorney, Agent, or Firm—Banner & Witcoff, Ltd.

(57) ABSTRACT

An I/O device to be connected to a network, which is configured to input and/or output data, includes a self-address storing system configured to store the I/O device address, a receiving system configured to receive data whose destination is an address stored in the self-address storing system, the data being transmitted through the network, a displaying system configured to display at least one of a character string and a graphic form, and an informing execution system configured to execute an informing operation with changing a display state of the displaying system, in response to the receiving system receiving data for confirming the location of the I/O device.

25 Claims, 19 Drawing Sheets

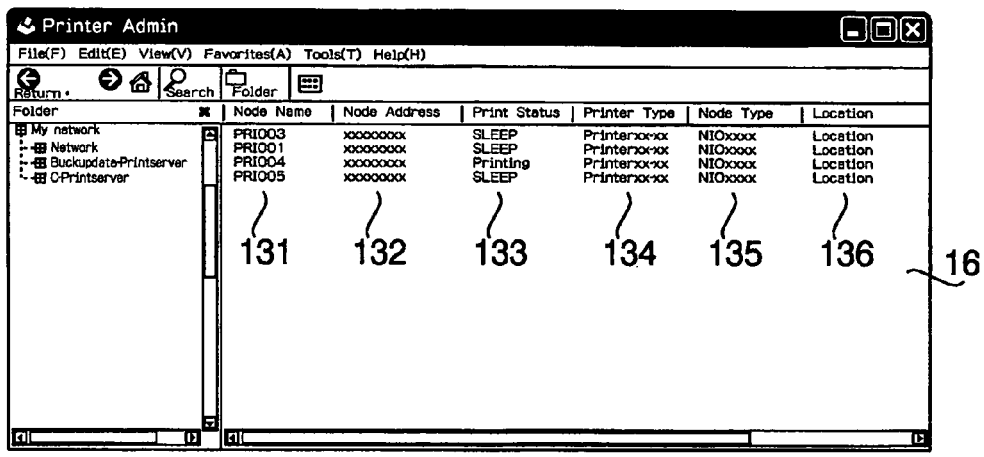
FIG.13A
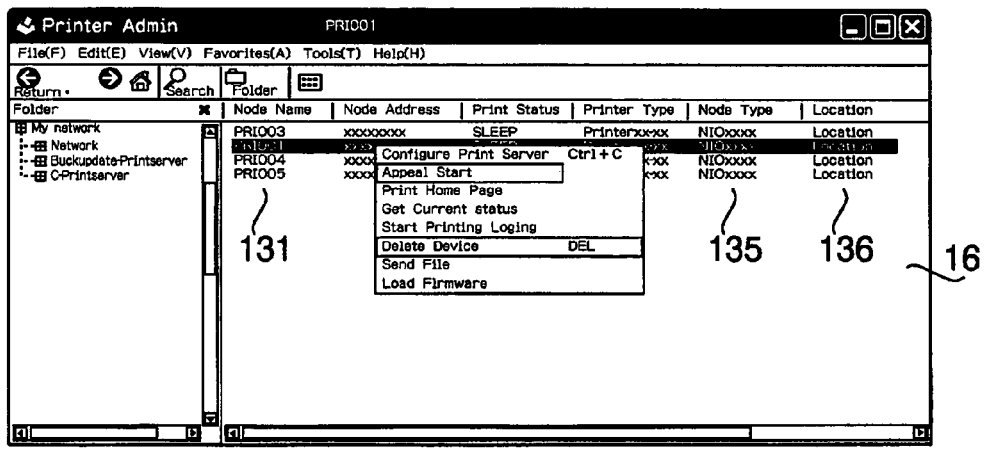
FIG.13B
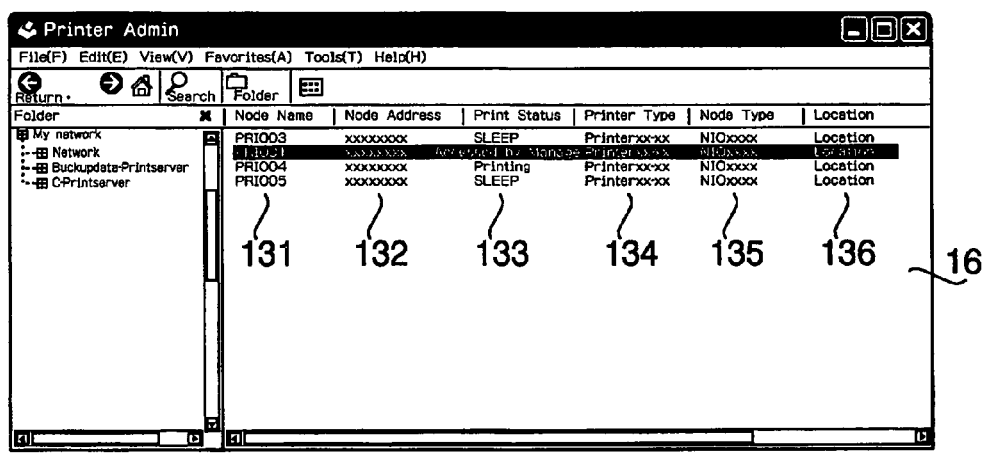
FIG.13C
FIG.13D

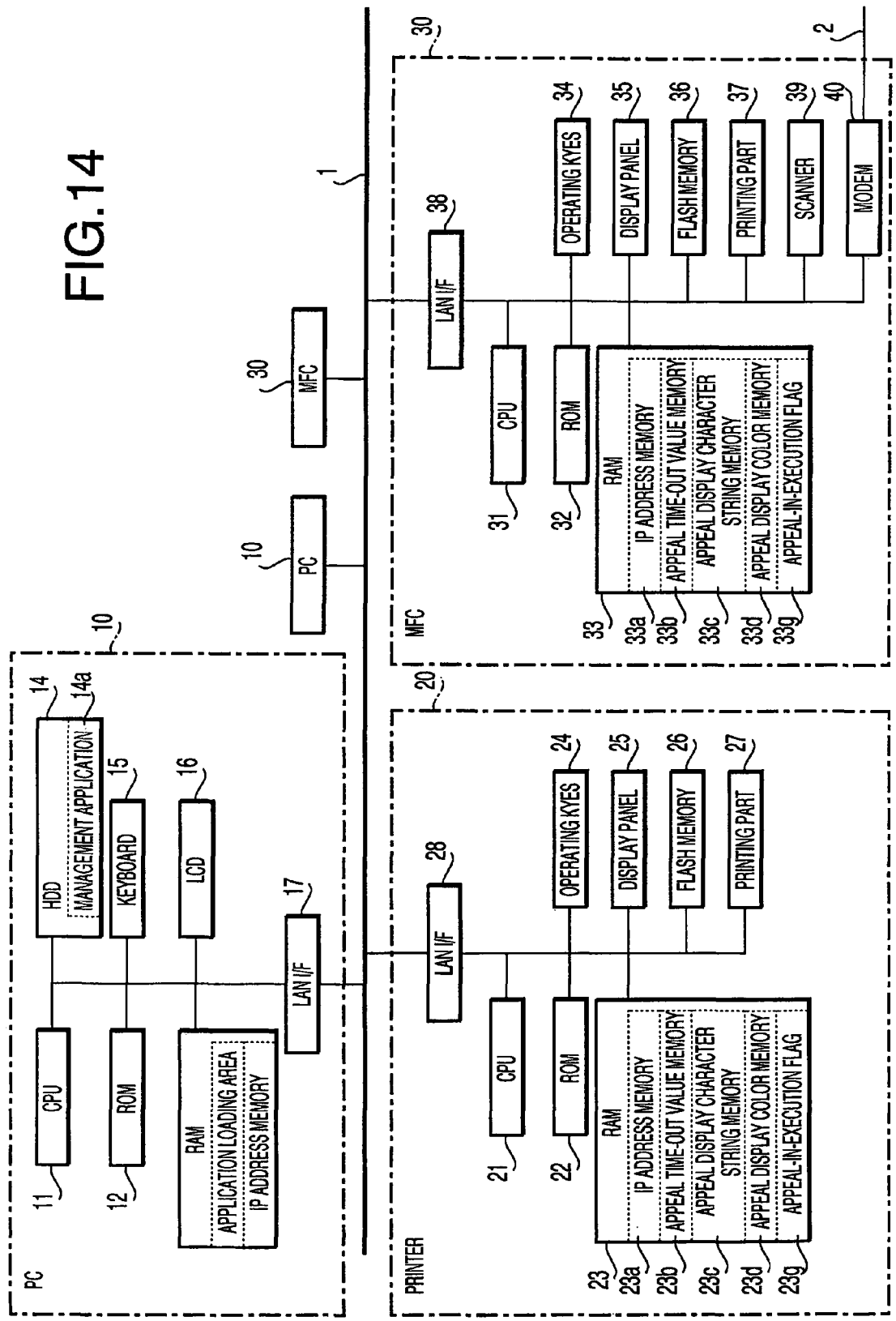

PRINTER DEVICE WITH EXTERNAL DISPLAY THAT PROVIDES VISUAL CONFIRMATION OF PRINTER DEVICE ON A NETWORK VIA PING DATA

CROSS-REFERENCE TO RELATED APPLICATION

This application claims priority under 35 U.S.C. §119 from Japanese Patent Application No. 2005-101378, filed on Mar. 31, 2005. The entire subject matter of the application is incorporated herein by reference.

TECHNICAL FIELD

Aspects of the invention relate to an I/O (input/output) device such as an image I/O device configured to input and/or output image data, a computer readable medium having computer-executable instructions executed by the I/O device, and a location confirmation system for confirming a location thereof, which allow a user to confirm the location of a specified I/O device among I/O devices connected to a network.

BACKGROUND

In a network system, one or more devices, such as a personal computer (hereinafter, referred to as a "PC"), printer, scanner, facsimile machine, and Multi Function Center (hereinafter, referred to as an "MFC") having functions of a printer, scanner, and facsimile machine, are connected to a network such as a Local Area Network (hereinafter, referred to as a "LAN"). Therefore, when a user operates a PC to make a printer perform a print-out operation, the user has to specify a printer to perform the print-out operation among printers connected to the network. In such a case, it can be difficult to specify an intended printer as many printers can be connected to the network.

Management tool software incorporated in the PC makes it possible to find a specified printer with a so-called "discover function", and to configure settings for the printer. However, since what is found by the discover function is an IP address (a device address defined on the network), a node name (a device name on the network), and/or a status of the printer, it is impossible to confirm an actual printer location, that is, where the specified printer is located physically rather than its location on the network.

In order to confirm such a printer location, it is necessary to previously input detailed information on the locations of printers to a location information database that a user can update, to previously prepare a floor map indicating the installation locations of the printers with the IP addresses and node names thereof, or to go around confirming the printers one by one based upon the IP addresses and/or node names clarified by the discover function. Another way to confirm the printer location is to change a printer status into a cover-opened state by opening a cover of the printer, or into a non-connected state by pulling a LAN cable out of the printer so as to individually confirm the printer locations.

Japanese Patent Provisional Publication No. HEI 9-6559 discloses a technique for confirming the locations of printers connected to a network. In the technique, when a confirmation signal is transmitted to a specified printer from a PC, information indicating the installation location of the printer is displayed on a display device of the PC. The information displayed on the display device of the PC, includes information on a section and floor where the printer is installed, and an IP address. Further, there is a technique to identifiably indicate the installation locations of the printers on a graphic image of the network.

However, in the techniques disclosed in Japanese Patent Provisional Publication No. HEI 9-6559, such as a technique to previously input detailed information on the printer locations in the location information database, or such as a technique to confirm the printer locations according to the previously prepared floor map indicating the printer installation locations with the IP addresses and/or node name, a lot of effort is need to make necessary materials and configure the settings. Also the aforementioned techniques take a lot of trouble for maintenance of updating the materials and settings whenever the printer installation locations are changed. In addition, in order to go around confirming the IP addresses and the node names of the printers one by one, it is necessary to individually operate the printers to make each of them display their IP address. Similarly, to confirm the printer locations displayed on the display devices of the PCs based upon the printer statuses, which have individually been changed, it is necessary to operate the printers by going between the PCs and the printers. In the above techniques, there is a problem that cumbersome operations may be required.

SUMMARY

Aspects of the invention can provide an I/O (input/output) device such as an image I/O device configured input and/or output image data, a computer readable medium having computer-executable instructions executed by the I/O device, and a location confirmation system for confirming a location thereof, which allow a user to confirm the location of a specified I/O device among I/O devices connected to a network.

BRIEF DESCRIPTION OF THE ACCOMPANYING DRAWINGS

FIG. 13A is an example of a display screen image on which there is listed devices connected to a network, the display screen image being displayed on an LCD of the PC that is to execute an appeal assignment according to at least one aspect of the invention.

FIG. 13B is an example of a display screen image displayed when the PC starts to execute the appeal assignment to devices it selected according to at least one aspect of the invention.

FIG. 13C is an example of a display screen image displayed on the LCD of the PC, which is executing the appeal assignment, during execution of the appeal assignment according to at least one aspect of the invention.

FIG. 13D is an example of a display screen image displayed on a display panel of a printer or an MFC, which is a target device whose location is to be confirmed, during execution of an informing operation (appeal) according to at least one aspect of the invention.

FIG. 14 is a block diagram showing an electrical configuration of a network system in another aspect according to the present invention.

DETAILED DESCRIPTION

General Overview

Figure 1:
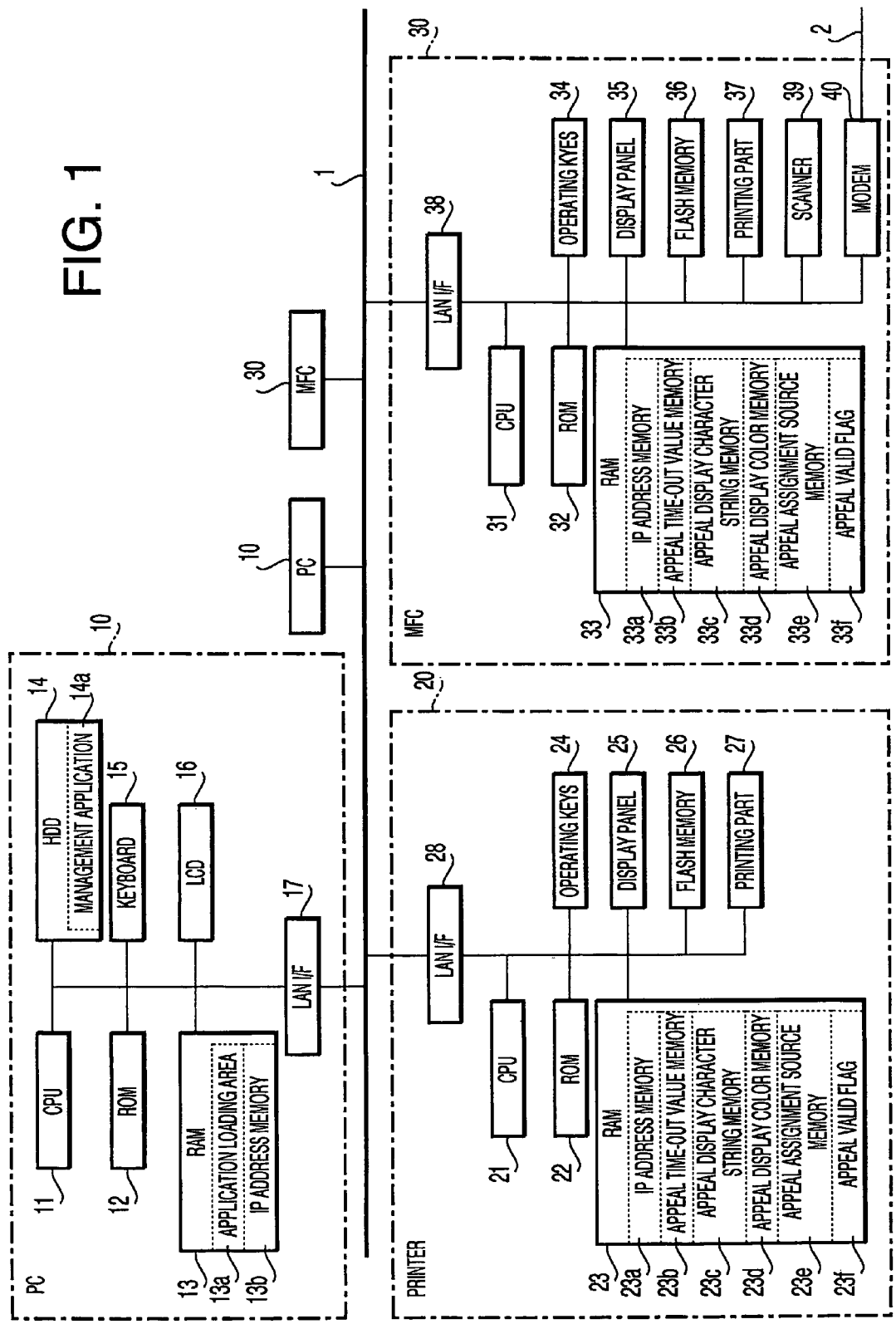
FIG. 1 is a block diagram showing an electrical configuration of a network system according to a first illustrative aspect of the present invention.

According to aspects of the present invention, there is provided an I/O device to be connected to a network, which is configured to input and/or output data. The device includes a self-address storing system configured to store the I/O device address; a receiving system configured to receive data whose destination is an address stored in the self-address storing system, the data being transmitted through the network; a displaying system configured to display at least one of a character string and a graphic form; and an informing execution system configured to execute an informing operation with changing a display state of the displaying system, in response to the receiving system receiving data for confirming the location of the I/O device.

In aspects of the above I/O device, when the receiving system receives the data that assigns the informing display condition and the data for confirming the location of the I/O device via the network, the informing execution system executes the informing operation for informing of the location of the I/O device when the display image of the displaying system changes based upon the information display condition. That is, since the I/O device provides its location when the display image of the displaying system changes based upon the assigned informing display condition, a user who has transmitted the data for confirming the location of the I/O device can confirm the location of the I/O device with an assigned device address by visually recognizing the I/O device that is executing the informing operation in accordance with the assigned informing display condition.

Optionally, the I/O device may further include an informing display condition storing system configured to store an informing display condition, under which the displaying system executes a displaying operation, in response to the receiving system receiving data that assigns the informing display condition. Optionally, the informing execution system may be configured to execute the informing operation with changing the display state of the displaying system based upon the informing display condition stored in the informing condition storing system.

In some aspects, when the receiving system receives the data that assigns the informing display condition through the network, the assigned informing display condition is stored in the informing display condition storing system. Then, the informing execution system executes the informing operation for informing of the location of the I/O device when the display image of the displaying system changes based upon the information display condition stored in the informing display condition storing system. That is, since the I/O device provides its location when the display image of the displaying system changes based upon the stored informing display condition, the user who has transmitted the data for confirming the location of the I/O device can confirm the location of the I/O device with the assigned device address by visually recognizing the I/O device that is executing the informing operation in accordance with the stored informing display condition.

Optionally, the I/O device may further includes a confirmation reservation storing system configured to store a reservation of confirming a location of the I/O device, in response to the receiving system receiving data for making the reservation of confirming the location of the I/O device, a reservation judging system configured to judge whether the reservation of confirming the location of the I/O device is stored in the confirmation reservation storing system, an informing execution system configured to execute an informing operation for informing of the location of the I/O device, in response to the receiving system receiving data for confirming the location of the I/O device, and the reservation judging system judges that the reservation of confirming the location of the I/O device is stored in the confirmation reservation storing system, and an informing condition storing system configured to store an informing display condition in response to the receiving system receiving data that assigns the informing display condition. Optionally, the informing execution system may be configured to execute the informing operation with changing a display state of the displaying system based upon the informing display condition stored in the informing condition storing system.

In the above I/O device, when the receiving system receives the data, which is transmitted through the network, for making the reservation of confirming the location of the I/O device, the reservation is stored in the confirmation reservation storing system. Then, when the receiving system receives the data for confirming the location of the I/O device, the reservation judging system judges whether the reservation is stored in the confirmation reservation storing system. If the reservation is judged to be stored in the confirmation reservation storing system, the informing execution system will execute the informing operation for making a user confirm the location of the I/O device. That is in some aspects, the informing operation for informing the user of the location of the I/O device is executed by following at least two procedures of the reservation and execution of confirming the location of the I/O device. Accordingly, when the I/O device for which the reservation of confirming has been made receives the data for confirming its location, the I/O device is allowed to execute the informing operation. Therefore, it is possible to avoid any confusion of the user who confirms the location of the I/O device.

In addition, when the receiving system receives the data that assigns the informing display condition, which is transmitted via the network, the assigned informing display condition is stored in the informing display condition storing system. Then, the receiving system receives the data, transmitted via the network, for confirming the location of the I/O device, the informing execution system informs of the location of the I/O device when the display image of the displaying system changes based upon the informing display condition. That is, since the I/O device informs of its own location when the display image of the displaying system changes based upon the assigned informing display condition, a user who has transmitted the data for confirming the location of the I/O device can confirm the location of the I/O device with the assigned device address by visually recognizing the I/O device that is executing the informing operation in accordance with the informing display condition.

Optionally, the I/O device may further includes a sending source address storing system configured to store a first device address of a sending source device that has sent data for making a reservation of confirming a location of the I/O device, in response to the receiving system receiving the data for making the reservation of confirming the location of the I/O device, an address judging system configured to judge whether a second device address of a sending source device that has sent data for confirming the location of the I/O device conforms with the first device address stored in the sending source address storing system, an informing execution system configured to execute an informing operation for informing of the location of the I/O device, in response to the receiving system receiving data for confirming the location of the I/O device, and the address judging system judges that the first device address of the sending source device which has sent the data for confirming the location of the I/O device conforms to the second device address stored in the sending source address storing system, and an informing condition storing system configured to store an informing display condition in response to the receiving system receiving data that assigns the informing display condition. Optionally, the informing execution system may be configured to execute the informing operation with changing a display state of the displaying system based upon the informing display condition stored in the informing condition storing system.

In some aspects, when the receiving system receives the data, which is transmitted through the network, for making the reservation of confirming the location of the I/O device, the device address of the sending source device of the data is stored in the sending source address storing system. Then, when the receiving system receives the data, transmitted via the network, for confirming the location of the I/O device, the address judging system judges whether the device address of the sending source device of the data conforms with the device address stored in the sending source address storing system. If they are judged to conform to each other, the informing execution system will execute the informing operation for making a user confirm the location of the I/O device. Namely, the informing operation for making the user confirm the location of the I/O device can be executed by following at least two procedures of the reservation and execution of confirming the location of the I/O device. Accordingly, the informing operation is allowed to be executed responsive to the data for confirming the location of the I/O device, which is transmitted from the external device (for example, a PC) that has made the reservation of confirming the location of the I/O device. Therefore, it is possible to avoid any confusion of the user who confirms the location of the I/O device.

In addition, when the receiving system receives the data that assigns the informing display condition, which is transmitted via the network, the assigned informing display condition is stored in the informing display condition storing system. Then, the receiving system receives the data, transmitted via the network, for confirming the location of the I/O device, the informing execution system informs of the location of the I/O device when the display image of the displaying system changes based upon the informing display condition. That is, since the I/O device informs of its own location when the display image of the displaying system changes based upon the assigned informing display condition, a user who has transmitted the data for confirming the location of the I/O device can confirm the location of the I/O device with the assigned device address by visually recognizing the I/O device that is executing the informing operation in accordance with the informing display condition.

Optionally, the receiving device may be configured to receive the data that assigns the informing display condition and the data for confirming the location of the I/O device.

In some aspects, since the receiving system can receive the data that assigns the informing display condition and the data for confirming the location of the I/O device, it is possible to avoid such a situation that the informing operation is not executed because the receiving system can receive one of the data, yet cannot receive the other.

Optionally, the data that assigns the informing display condition may assign a color for informing of the location of the I/O device. Optionally, the informing execution system may be configured to execute the informing operation with displaying the assigned color stored in the informing display condition storing system on at least a part of the displaying system.

In some aspects, since the data that assigns the informing display condition assigns a color for informing of the location of the I/O device, and the informing execution system executes the informing operation with displaying the assigned color stored in the informing display condition storing system on at least a part of the displaying system, the user can confirm the location of the I/O device only by identifying the displayed color. Therefore, the user can differentiate one terminal device from the other terminal devices with color tones (a color tone pattern). In addition, a color tone pattern formed from color tones can be easier for the user to memorize than information configured with an arrangement of characters or numerals. Thereby, even though terminal devices are connected to the network, the user can easily memorize each of the terminal devices by associating each of them with the color tone pattern, and can easily recognize the location of the intended terminal device to be operated using the color tone pattern as an indication in the case of using the terminal device.

Alternatively or optionally, the data that assigns the informing display condition may assign at least one of a character string and a graphic form for executing the informing operation. Optionally, the informing execution system may be configured to execute the informing operation with displaying the assigned one of the character string and the graphic form.

According to some aspects, the data that assigns the informing display condition assigns at least one of a character string and a graphic form for executing the informing operation, and the informing execution system executes the informing operation with displaying the assigned one of the character string and the graphic form. Accordingly, the user can confirm the location of the I/O device by recognizing the displayed character string or graphic form. Therefore, the user can differentiate one terminal device from the other terminal devices with the graphic form (graphic form pattern). In other words, it is easy for the user to grasp the meaning of a representation pattern in the case where the representation pattern is a graphic form pattern, compared with the case where the representation pattern is a character string or a symbol string. For this reason, the user can promptly discriminate the terminal device by viewing the graphic form at a glance, without interpreting the character string or symbol string. In addition, since the graphic form pattern can be memorized, even though terminal devices are connected to the network, the user can easily memorize each of the terminal devices by associating each of them with the graphic form pattern, and can readily recognize the location of the intended terminal device to be operated using the graphic form pattern as an indication in the case of using the terminal device. It is noted that an icon can be cited as an example of the graphic form to be displayed on the displaying system in the informing operation.

Optionally, the I/O device may further include an informing time measuring system configured to measure an execution time of the informing operation by the informing execution system, and an informing termination system configured to terminate the informing operation executed by the informing execution system, in response to greater than or equal to a predetermined time having been measured by the informing time measuring system.

In some aspects, when a time measured by the informing time measuring system is greater than or equal to the predetermined time, the informing termination system terminates the informing operation executed by the informing execution system, it is possible to terminate the informing operation for informing the user of the location of the I/O device when the predetermined time has elapsed. Accordingly, even when any assignment for terminating the informing operation cannot be received after executing the informing operation according to the assignment of the informing operation, it is possible to automatically terminate the informing operation. It is noted that the predetermined time, which is an opportunity for terminating the informing operation by the informing termination system, may be a fixed time or a time which can be set by a user of an external device (for example, a PC) who uses the I/O device via the network.

Further optionally, the informing time measuring system may be configured to start measuring the execution time of the informing operation, in response to the receiving system receiving the data for confirming the location of the I/O device. Optionally, the informing time measuring system may be configured to restart measuring the execution time of the informing operation from a reset state, in response to the receiving system further receiving the data for confirming the location of the I/O device while the informing time measuring system is measuring the execution of time of the informing operation.

In some aspects the informing time measuring system starts measuring the execution time of the informing operation, when the receiving system receives the data for confirming the location of the I/O device. Further, when the receiving system receives the data for confirming the location of the I/O device while the informing time measuring system is measuring the execution of time of the informing operation, the informing time measuring system restarts measuring the execution time of the informing operation from a reset state.

Optionally, the I/O device may further include an operation executing system configured to execute a specified operation, an execution status displaying system configured to display on the displaying system a status of the execution status displaying system under operation, in response to the operation executing system being executing the specified operation, and an informing non-execution system configured to cause the informing execution system not to execute the informing operation, even though the receiving system receives the data for confirming the location of the I/O device, in response to the execution status displaying system being to display on the displaying system the status of the execution status displaying system under operation.

According to some aspects, even though the receiving system receives the data for confirming the location of the I/O device, when the execution status displaying system is to display on the displaying system the status of the operation execution system being in execution, the informing non-execution system causes the informing execution system not to execute the informing operation. Hence, a user in front of the I/O device can visually recognize a display image that is originally to be displayed without interruption by the informing operation.

It is noted that there are cited as examples of the specified operation executed by the operation executing system a printout operation, a scanning operation, a facsimile transmission operation, an operation executed according to operating the operating device such as an operation panel of the I/O device. The informing non-execution system may be configured to allow the informing operation when an operation, which is not to be displayed or is yet to be displayed is not important enough to be displayed, other than the specified operation, is executed.

Still optionally, the I/O device may further include an operating device configured to be operable by a user. In this case, the operation executing system may be configured to execute the specified operation corresponding to an operation of the operating device carried out by the user, and the execution status displaying system may be configured to display on the displaying system a display state corresponding to the operation of the operating device carried out by the user.

According to the aforementioned configuration, the operation executing system executes the specified operation corresponding to an operation of the operating device when the operating device is operated by the user. At the same time, the execution status displaying system displays on the displaying system a display image corresponding to the operation of the operating device. Accordingly, it is possible to avoid a situation where the operation of the operating device by the user is disturbed by the informing operation.

According to another aspect of the present invention, there is provided an I/O device to be connected to a network, which is configured to input and/or output data, including: a self-address storing system configured to store the I/O device address; a receiving system configured to receive data whose destination is an address stored in the self-address storing system, the data being transmitted through the network; a confirmation reservation storing system configured to store a reservation of confirming a location of the I/O device, in response to the receiving system receiving data for making the reservation of confirming the location of the I/O device; a reservation judging system configured to judge whether the reservation of confirming the location of the I/O device is stored in the confirmation reservation storing system; and an informing execution system configured to execute an informing operation for informing of the location of the I/O device, in response to the receiving system receiving data for confirming the location of the I/O device, and the reservation judging system judges that the reservation of confirming the location of the I/O device is stored in the confirmation reservation storing system.

In the above I/O device, when the receiving system receives the data, which is transmitted through the network, for making the reservation of confirming the location of the I/O device, the reservation is stored in the confirmation reservation storing system. Then, when the receiving system receives the data for confirming the location of the I/O device, the reservation judging system judges whether the reservation is stored in the confirmation reservation storing system. If the reservation is judged to be stored in the confirmation reservation storing system, the informing execution system will execute the informing operation for making a user confirm the location of the I/O device. That is in some aspects, the informing operation for informing the user of the location of the I/O device is executed by following at least two procedures of the reservation and execution of confirming the location of the I/O device. Accordingly, when the I/O device for which the reservation of confirming has been made receives the data for confirming its location, the I/O device is allowed to execute the informing operation. Therefore, it is possible to avoid any confusion of the user who confirms the location of the I/O device.

According to a further aspect of the present invention, there is provided an I/O device to be connected to a network, which is configured to input and/or output data, including: a self-address storing system configured to store the I/O device address; a receiving system configured to receive data whose destination is an address stored in the self-address storing system, the data being transmitted through the network; a sending source address storing system configured to store a first device address of a sending source device that has sent data for making a reservation of confirming a location of the I/O device, in response to the receiving system receiving the data for making the reservation; an address judging system configured to judge whether a second device address of a sending source device that has sent data for confirming the location of the I/O device conforms with the stored first device address; and an informing execution system configured to execute an informing operation for informing of the location of the I/O device, in response to the receiving system receiving the data for confirming the location of the I/O device, and the address judging system judges that the first device address conforms to the second device address stored in the sending source address storing system.

In aspects of the above-mentioned I/O device, when the receiving system receives the data, which is transmitted through the network, for making the reservation of confirming the location of the I/O device, the device address of the sending source device of the data is stored in the sending source address storing system. Then, when the receiving system receives the data, transmitted via the network, for confirming the location of the I/O device, the address judging system judges whether the device address of the sending source device of the data conforms with the device address stored in the sending source address storing system. If they are judged to conform to each other, the informing execution system will execute the informing operation for making a user confirm the location of the I/O device. Namely, the informing operation for making the user confirm the location of the I/O device can be executed by following at least two procedures of the reservation and execution of confirming the location of the I/O device. Accordingly, the informing operation is allowed to be executed responsive to the data for confirming the location of the I/O device, which is transmitted from the external device (for example, a PC) that has made the reservation of confirming the location of the I/O device. Therefore, it is possible to avoid any confusion of the user who confirms the location of the I/O device.

According to a further aspect of the present invention, there is provided a computer readable medium having computer-executable instructions stored thereon, the instructions adapted to be executed by an I/O device including a displaying system that displays at least one of a character string and a graphic form, the I/O device being configured to input and/or output data and operate while being connected to a network. The instructions when executed perform a method including: storing a device address of the I/O device; receiving data whose destination is the device address stored in the I/O device, the data being transmitted through the network; and informing of a location of the I/O device with changing a display state of the displaying system, in response to data for confirming the location of the I/O device being received in said receiving the data.

In aspects of the above computer readable medium, when the data transmitted via the network that assigns the informing display condition is received in the receiving the data, and the data transmitted via the network for confirming the location of the I/O device is received in the step of receiving the data, the step of informing of the location of the I/O device is executed when the display image of the displaying system changes based upon the assigned informing display condition. Namely, the I/O device that executes the instructions stored on the computer readable medium informs of its own location when the display image of the displaying system changes in accordance with the assigned informing display condition. Therefore, a user, who has sent the data for confirming the location of the I/O device, can confirm the location of the I/O device having the assigned device address by visually recognizing the I/O device executing the informing operation based upon the assigned informing display condition.

According to a further aspect of the present invention, there is provided a computer readable medium having computer-executable instructions stored thereon, the instructions adapted to be executed by an I/O device that is configured to input and/or output data and operate while being connected to a network. The instructions when executed perform a method including: storing a device address of the I/O address; receiving data whose destination is the device address stored in the I/O device, the data being transmitted through the network; storing a reservation of confirming a location of the I/O device, in response to the data for making the reservation being received in said receiving the data; judging whether the reservation of confirming the location of the I/O device is stored in the I/O device; and informing of the location of the I/O device, in response to the data for confirming the location of the I/O device being received in said receiving the data, and the judging judges that the reservation of confirming the location of the I/O device is stored in the I/O device.

In aspects of the above computer readable medium, when the data for making the reservation of confirming the location of the I/O device, which is transmitted via the network, is received in the receiving the data, the reservation of confirming a location of the I/O device is stored is the step of storing the reservation. Then, when the data for confirming the location of the I/O device, which is transmitted via the network, is received in the receiving the data, it is judged, in the judging, whether the reservation of confirming the location of the I/O device is stored in the I/O device. If it is judged that the reservation of confirming the location of the I/O device is stored in the I/O device, the informing step for making a user confirm the location of the I/O device will be executed. Namely, the informing can be executed by following at least two procedures of the reservation and execution of confirming the location of the I/O device. Accordingly, informing is allowed to be executed responsive to the data for confirming the location of the I/O device, which is transmitted from the external device (for example, a PC) that has made the reservation of confirming the location of the I/O device. Therefore, it is possible to avoid any confusion of the user who confirms the location of the I/O device.

According to a further aspect of the present invention, there is provided a computer readable medium having computer-executable instructions stored thereon, the instructions adapted to be executed by an I/O device that is configured to input and/or output data and operate while being connected to a network. The instructions when executed perform a method including: storing a device address of the I/O address; receiving data whose destination is the device address stored in the I/O device, the data being transmitted through the network; storing a first device address of a sending source device that has sent data for making a reservation of confirming a location of the I/O device, in response to the data for making the reservation being received in said receiving the data; judging whether a second device address of a sending source device that has sent data for confirming the location of the I/O device conforms with the stored first device address; and informing of the location of the I/O device, in response to the data for confirming the location of the I/O device being received in said receiving the data, and the judging judges that the second device address conforms to the stored first device address.

In the above-mentioned control program, when the data for making the reservation of confirming the location of the I/O device, which is transmitted via the network, is received in the receiving the data, the device address of the sending source device is stored in the storing the device address of the sending source device. Then, when the data for confirming the location of the I/O device, which is transmitted via the network, is received in the receiving the data, it is judged, in the judging, whether the device address of the sending source device that has sent the data for confirming the location of the I/O device conforms with the stored device address. If it is judged that the device addresses conform to each other, the informing step for making a user confirm the location of the I/O device will be executed. Namely, the informing can be executed by following at least two procedures of the reservation and execution of confirming the location of the I/O device. Accordingly, informing is allowed to be executed responsive to the data for confirming the location of the I/O device, which is transmitted from the external device (for example, a PC) that has made the reservation of confirming the location of the I/O device. Therefore, it is possible to avoid any confusion of the user who confirms the location of the I/O device.

According to a further aspect of the present invention, there is provided a location confirming system, which is configured to confirm a location of an I/O device configured to input and/or output data, including: a network; at least one host device connected to the network; and a plurality of I/O devices connected to the network. The at least one host device includes: a first displaying system configured to display at least one of a character string and a graphic form; a transmitting system configured to transmit data to a specified one of the plurality of I/O devices connected to the network; an operating device configured to be operable by a user; and a confirmation requesting system configured to make the transmitting system transmit to the specified one of the plurality of I/O devices a confirmation requesting data for requesting a confirmation of the location of the specified one of the plurality of I/O devices, and to display on the first displaying system a display image for informing of a confirmation requesting operation for requesting a confirmation of the location of the specified one of the plurality of I/O devices being in execution, in response to the confirmation requesting operation being executed with the first operating device being operated by the user. The I/O device includes; a self-address storing system configured to store the I/O device address; a receiving system configured to receive data whose destination is an address stored in the self-address storing system, the data being transmitted through the network; a second displaying system configured to display at least one of a character string and a graphic form; and an informing execution system configured to execute an informing operation for informing of the location of the I/O device with changing a display state of the second displaying system, in response to the receiving system receiving the confirmation requesting data transmitted from the at least one host device.

In the above location confirming system, when the confirmation requesting operation is executed with the first operating device being operated by the user, the confirmation requesting system makes the transmitting system transmit to the specified I/O device the confirmation requesting data, and displays on the first displaying system of the host device the display image for informing of the confirmation requesting operation being in execution. In the I/O device, when the receiving system receives the confirmation requesting data transmitted from the host device, the informing execution system executes the informing operation when the display image of the second display system changes. Thus, the location of the I/O device connected to the network is confirmed with changing both of the display images of the host device instructing to confirm the location and the I/O device instructed to confirm the location. Accordingly, the location of the I/O device can be easily confirmed with associating the I/O device with the host device. That is, the user can easily confirm where the I/O device, which is being displayed on the first displaying system of the host device, is located only by visually recognizing the I/O device.

Optionally, the host device may further include a status confirming system configured to make the transmitting system transmit to the specified I/O device status confirming data for confirming a status of the specified I/O device, a status displaying system configured to display on the first displaying system the statuses of the I/O devices, the statuses being confirmed by the status confirming system, and a selecting system configured to select an I/O device whose location is to be confirmed among the I/O devices whose statuses are displayed on the first displaying system by the status displaying system.

According to the aforementioned location confirming system, the statuses of the I/O devices, which are confirmed by the status confirming system of the host device, are displayed on the first displaying system by the status displaying system. Among the displayed statuses, an I/O device whose location is to be confirmed is selected by the selecting system. Hence, it is readily achieved to select an I/O device whose location is to be confirmed, with confirming the status of the I/O device on the first displaying system. Namely, the user can confirm where the I/O device, which the user has selected on the first displaying system of the host device, is located by visually recognizing the I/O device.

Optionally, the host device may further include an informing condition assigning system configured to make the transmitting system transmit to the specified I/O device an informing condition assigning data for assigning an informing display condition that is applied when informing of the location of the specified I/O device. In this case, the confirmation requesting system may be configured to display on the first displaying system the display image for informing of the confirmation requesting operation being in execution based upon the informing display condition assigned by the informing condition assigning system. Optionally, the I/O device may further include an informing display condition storing system configured to store the assigned informing display condition in response to the receiving system receiving the informing condition assigning data transmitted from the at least one host device. Further, the informing execution system may be configured to inform of the location of the I/O device with changing a display state of the second displaying system based upon the informing display condition stored in the informing display condition storing system.

Aspects include the informing condition assigning system making the transmitting system transmit the informing condition assigning data to the specified I/O device. The confirmation requesting system makes the transmitting system transmit to the specified I/O device the confirmation requesting data, and at the same time, displays on the first displaying system the display image for informing of the confirmation requesting operation in process based upon the informing display condition assigned by the informing condition assigning system. In the I/O device, when the receiving system receives the informing condition assigning data transmitted from the host device, the assigned informing display condition is stored in the informing display condition storing system. Then, when the receiving system receives the confirmation requesting data transmitted from the host device, the informing execution system informs of the location of the I/O device when the display image of the second displaying system changes based upon the informing display condition stored in the informing display condition storing system. In this way, the confirmation of the I/O device connected to the network is carried out with changing both of the display images of the host device instructing to confirm the location and the I/O device instructed to confirm the location based upon the assigned informing display condition. Therefore, the location of the I/O device is readily confirmed by associating the I/O device with the host device. That is, in some aspects the user can confirm where the I/O device, of which the informing display condition is assigned on the first displaying system of the host device by the user, is located only by visually recognizing the I/O device.

Optionally, the host device may further include an informing time assigning system configured to make the transmitting system transmit to the specified I/O device an informing time assigning data for assigning an informing time during which the informing operation is to be executed. Furthermore, the I/O device may further include an informing time storing system configured to store the assigned informing time in response to the receiving system receiving the informing time assigning data, an informing time measuring system configured to measure an execution time of the informing operation executed by the informing execution system, and an informing termination system configured to terminate the informing operation executed by the informing execution system, in response to the execution time of the informing operation measured by the informing time measuring system being more than the assigned informing time stored in the informing time storing system.

In some aspects the informing time assigning system makes the transmitting system transmit to the specified I/O device the informing time assigning data for assigning the informing time during which the informing operation is to be executed. In the I/O device, when the receiving system receives the informing time assigning data transmitted from the host device, the assigned informing time is stored in the informing time storing system. When the informing execution system executes the informing operation, the execution time of the informing operation is measured by the informing time measuring system. If the execution time of the informing operation measured by the informing time measuring system is more than the assigned informing time stored in the informing time storing system, the informing operation executed by the informing execution system will be terminated by the informing termination system. Accordingly, even when the I/O device cannot receive any assignment for terminating the informing operation after executing the informing operation according to the assignment of the informing operation, it is possible to automatically terminate the informing operation without keeping on the informing operation.

Optionally, the host device may further include a status confirming system configured to make the transmitting system transmit to the specified I/O device status confirming data for confirming a status of the specified I/O device, and a termination warning system configured to warn that the confirmation requesting operation in execution is to be terminated, in response to the status confirming system confirming that the specified I/O device is in execution of a predetermined operation during the confirmation requesting operation being executed by the confirmation requesting system.

In some aspects, when the status confirming system confirms that the specified I/O device is executing the predetermined operation while the confirmation requesting operation is being executed by the confirmation requesting system, the termination warning system warns (induces) that the confirmation requesting operation executed is to be terminated. In the I/O device, when the predetermined operation is in execution, a display image corresponding to the predetermined operation is generally displayed on the second displaying system. The informing operation is executed using the display image of the second displaying system. Therefore, by inducing the user of the host device to terminate the informing operation when the I/O device begins to execute the predetermined operation, the I/O device can display a display image, which is originally to be displayed, corresponding to the predetermined operation in execution.

Optionally, the host device may further include an operation assigning system configured to make the transmitting system transmit to the specified I/O device an operation assigning data for assigning a predetermined operation, when the specified I/O device is assigned to execute the predetermined operation with the operating device being operated by the user, and a termination inducing display system configured to display on the first displaying system a display state for inducing to terminate the confirmation requesting operation being executed by the specified I/O device, which is assigned to execute the predetermined operation by the operation assigning system.

In some aspects, the specified I/O device is instructed to execute a predetermined operation with the operating device being operated by the user while the confirmation requesting system of the host device is executing the confirmation requesting operation, the operation assigning system makes the transmitting system transmit to the specified I/O device the operation assigning data for assigning the predetermined operation. Then, the termination inducing display system displays on the first displaying system the display image for inducing to terminate the confirmation requesting operation being executed by the specified I/O device. In the I/O device, when a predetermined operation is in execution, a display image corresponding to the predetermined operation is generally displayed on the second displaying system. Thus, when the I/O device, which is executing the informing operation, is instructed to execute a predetermined operation, the host device displays on the first displaying system the display image for inducing to terminate the confirmation requesting operation in execution. Accordingly, the I/O device can display a display image, which is originally to be displayed, corresponding to the predetermined operation in execution with the confirmation requesting operation being terminated according to the inducing display image by the user of the host device.

Optionally, the host device may further include an operation assigning system configured to make the transmitting system transmit to the specified I/O device an operation assigning data for assigning a predetermined operation, in response to the specified I/O device being assigned to execute the predetermined operation with the operating device being operated by the user, and a confirmation terminating system configured to make the transmitting system transmit confirmation terminating data for terminating confirmation of the location of the specified I/O device to the specified I/O device that is assigned to execute the predetermined operation with the operating device being operated by the user, and to set back a display state of the first displaying system in a state before execution of the confirmation requesting operation.

In some aspects, the specified I/O device is instructed to execute a predetermined operation with the operating device being operated by the user while the confirmation requesting system of the host device is executing the confirmation requesting operation, the operation assigning system makes the transmitting system transmit to the specified I/O device the operation assigning data for assigning the predetermined operation. Further, the confirmation terminating system makes the transmitting system transmit to the specified I/O device the confirmation terminating data, so as to set back the display image of the first displaying system in the state before execution of the confirmation requesting operation. When the I/O device receives the confirmation terminating data, the I/O device terminates execution of the informing operation. In the I/O device, when a predetermined operation is in execution, a display image corresponding to the predetermined operation is generally displayed on the second displaying system. In this way, when the I/O device that is executing the informing operation is instructed to execute the predetermined operation, the confirmation requesting operation in execution can be terminated. Therefore, the I/O device can display a display image, which is originally to be displayed, corresponding to the predetermined operation in execution.

Optionally, the host device may further include a confirmation terminating system configured to make the transmitting system transmit to the specified I/O device confirmation terminating data for terminating confirmation of the location of the specified I/O device, and set back a display state of the first displaying system in a state before execution of the confirmation requesting operation, in response to the confirmation requesting system being assigned to terminate the confirmation requesting operation with the operating device being operated by the user. Further optionally, the I/O device may include an informing termination system configured to terminate the informing operation with setting back a display state of the second displaying system in a state before execution of the informing operation, in response to the receiving system receiving the confirmation terminating data transmitted from the host device.

According to the above configuration, when the confirmation requesting system is assigned to terminate the confirmation requesting operation with the operating device being operated by the user, the confirmation terminating system makes the transmitting system transmit to the specified I/O device the confirmation terminating data, and set back the display image of the first displaying system in the state before execution of the confirmation requesting operation. In the I/O device, when the receiving device receives the confirmation terminating data transmitted from the host device, the informing termination system terminates the informing operation with setting back the display image of the second displaying system in the state before execution of the informing operation. Thus, accompanied by terminating the informing operation, both of the display images of the host device and I/O device can be set back in the state before execution of the informing operation.

Illustrative Aspects

Hereinafter, illustrative aspects according to the present invention will be explained with reference to the accompanying drawings.

FIG. 1 is a block diagram showing an electrical configuration of a network system according to certain aspects of the present invention. The network system is configured with personal computers (hereinafter, referred to as "PCs") 10, printers 20, and Multi Function Centers (hereinafter, referred to as "MFCs") 30, connected with each other via Local Area Network cables (hereinafter, referred to as "LAN cables") 1. The network system is a system for confirming a location of a specified device among the printers 20 and the MFCs 30 connected to LAN cable 1.

The PC is provided with a CPU 11, ROM 12, RAM 13, hard disk drive (hereinafter, referred to as an "HDD") 14, keyboard 15, liquid crystal display (hereinafter, referred to as an "LCD") 16, and LAN interface (hereinafter, referred to as an "LAN I/F") 17. The CPU 11 is an arithmetic processing unit that executes a program stored in a ROM 12 and/or RAM 13. The ROM 12 is a non-rewritable memory that stores a basic program such as a boot program.

The RAM 13 is a rewritable memory provided with an application loading area 13a and an IP address memory 13b. The application loading area 13a temporarily loads an application program stored in the HDD 14. The HDD 14 is a rewritable memory that stores an operating system executed by the PC 10 and/or various kinds of application programs. A management application program 14a shown in flowcharts of FIGS. 2 to 7 is stored in the HDD 14 as well. The management application program 14a is loaded into the application loading area 13a of the RAM 13 to be executed by the CPU 11. In addition, the IP address memory 13b of the RAM 13 stores an address, defined on the LAN, of the PC 10.

The keyboard 15 is an input device for inputting data based upon operations of a user. The LCD 16 is a display device that displays characters, figures, icons, etc. The LAN I/F 17 is an interface for sending and receiving data to and from each of the devices connected the LAN cable 1

The printer 20 includes a CPU 21, ROM 22, RAM 23, operating keys 24, display panel 25, flash memory 26, printing part 27, and LAN I/F 28. The CPU 21 is an arithmetic processing unit that executes a program stored in the ROM 22. The ROM 22 is a non-rewritable memory that stores a program shown in flowcharts of FIGS. 8 to 12.

The RAM 23 is a rewritable memory provided with an IP address memory 23a, appeal time-out value memory 23b, appeal display character string memory 23c, appeal display color memory 23d, appeal assignment source memory 23e, appeal valid flag 23f. The IP address memory 23a stores an address, defined on the LAN, of the printer 20. The appeal time-out value memory 23b stores an execution time of an "appeal", i.e., an informing operation for informing the user of the location of the printer 20. When receiving an SNMP (Simple Network Management Protocol) message for setting the appeal time from the PC 10, this memory 23b stores the time assigned by the message. The appeal time-out value memory 23b, for example, stores a time of one minute.

The appeal display character string memory 23c is a memory that stores a character string to be displayed on the display panel 25, when the informing operation for informing the user of the location of the printer 20 is executed. When receiving an SNMP message assigning the appeal display character string from the PC 10, the character string memory 23c stores the character string assigned by the message. The appeal display color memory 23d stores a background color to be displayed on the display panel 25, when the informing operation for informing the user of the location of the printer 20 is executed. When receiving an SNMP message assigning the appeal display color from the PC 10, this memory 23d stores the color assigned by the message. When the informing operation for informing the user of the location of the printer 20 is executed, a background color displayed on the display panel 25 is changed to the color stored in the appeal display color memory 23d, and the character string stored in the appeal display character string memory 23c is displayed. Therefore, it is possible to visually recognize the printer 20 during the informing operation (appeal) (while confirming the location thereof) only by confirming the display panel 25 of the printer 20.

The appeal assignment source memory 23e is a memory that stores the IP address of the PC 10 to be an execution source device of the appeal assignment. The informing operation (appeal) is executed, when the printer 20 receives Ping packet data with a destination of the IP address of the printer 20. While receiving the Ping packet data, the informing operation (appeal) is executed only in the case where an IP address of a device sending the data coincides with the IP address stored in the appeal assignment source memory 23e. Thereby, even though receiving Ping packet data from a wrong PC 10, the informing operation (appeal) will not be executed. For this reason, the informing operation (appeal) can be executed only by the appeal assignment, issued from the PC 10, assigning the appeal display character string and appeal display color.

The appeal valid flag 23f is set ON in the state where the informing operation (appeal) is allowed to be executed, while it is set OFF in the state where the informing operation (appeal) is not allowed to be executed. The appeal valid flag 23f is set ON, when receiving an SNMP message informing that the informing operation (appeal) is valid from the PC 10. The appeal valid flag 23f is set OFF, when receiving an SNMP message informing that the informing operation (appeal) is invalid from the PC, when the informing operation (appeal) is kept being executed for more than the time stored in the appeal time-out value memory 23b, or when the operating keys 24 of the printer 20 are operated by the user of the printer 20.

The operating keys 24 are input devices for operating the printer 20. The display panel 25 is a display device displaying characters, figures, icons, etc. As mentioned above, when the informing operation (appeal) is executed, a display image on the display panel 25 is changed to announce the existence of the printer 20. The flash memory 26 is a non-volatile rewritable memory. Data stored in the memory 26 will be maintained even though the printer 20 is powered off. The printing part 27 performs print-out on a paper and feeding the printed paper. The LAN I/F 28 is an interface for sending and receiving data to and from each of the devices connected to the LAN cable 1.

The MFC 30 is a Multi Function Center provided with functions as a facsimile machine and scanner as well as a function as a printer. The MFC 30 includes a CPU 31, ROM 32, RAM 33, operating keys 34, display panel 35, flash memory 36, printing part 37, LAN I/F 38, scanner 39, and modem 40. Since, among them, each of the CPU 31, ROM 32, RAM 33, operating keys 34, display panel 35, flash memory 36, printing part 37, and LAN I/F 38 has the same function as that of the corresponding element of the aforementioned printer 20, description of the function thereof will be omitted. The scanner 39 reads out an image, and the read image is stored in the RAM 34 or the flash memory 36 as a digital data. The modem 40 modulates and demodulates the image data, which is transmitted to another facsimile machine over a telephone line 2. The modem 40 also sends and receives various kinds of protocol signals for transmission control.

Next, referring to flowcharts and display image examples shown in FIGS. 2 to 13, control operations for confirming the location of a specified device among the printers 20 and MFCs 30 will be explained. The control operations shown in the flowcharts of FIGS. 2 to 7 are employed to control the management application program 14a executed by a PC 10, which confirms the location of a specified device, among the PCs 10 connected to the network system.

When the management application program 14a is executed, the image shown in FIG. 13A is displayed on the LCD 16 of the PC 10. In other words, there are displayed on a list on the LCD 16 node names 131, IP addresses 132, statuses 133 indicating device conditions, model names 134, interface model numbers 135, and additional information 136, regarding all of the printers 20 and MFCs 30 connected to the LAN cable 1.

Figure 2:
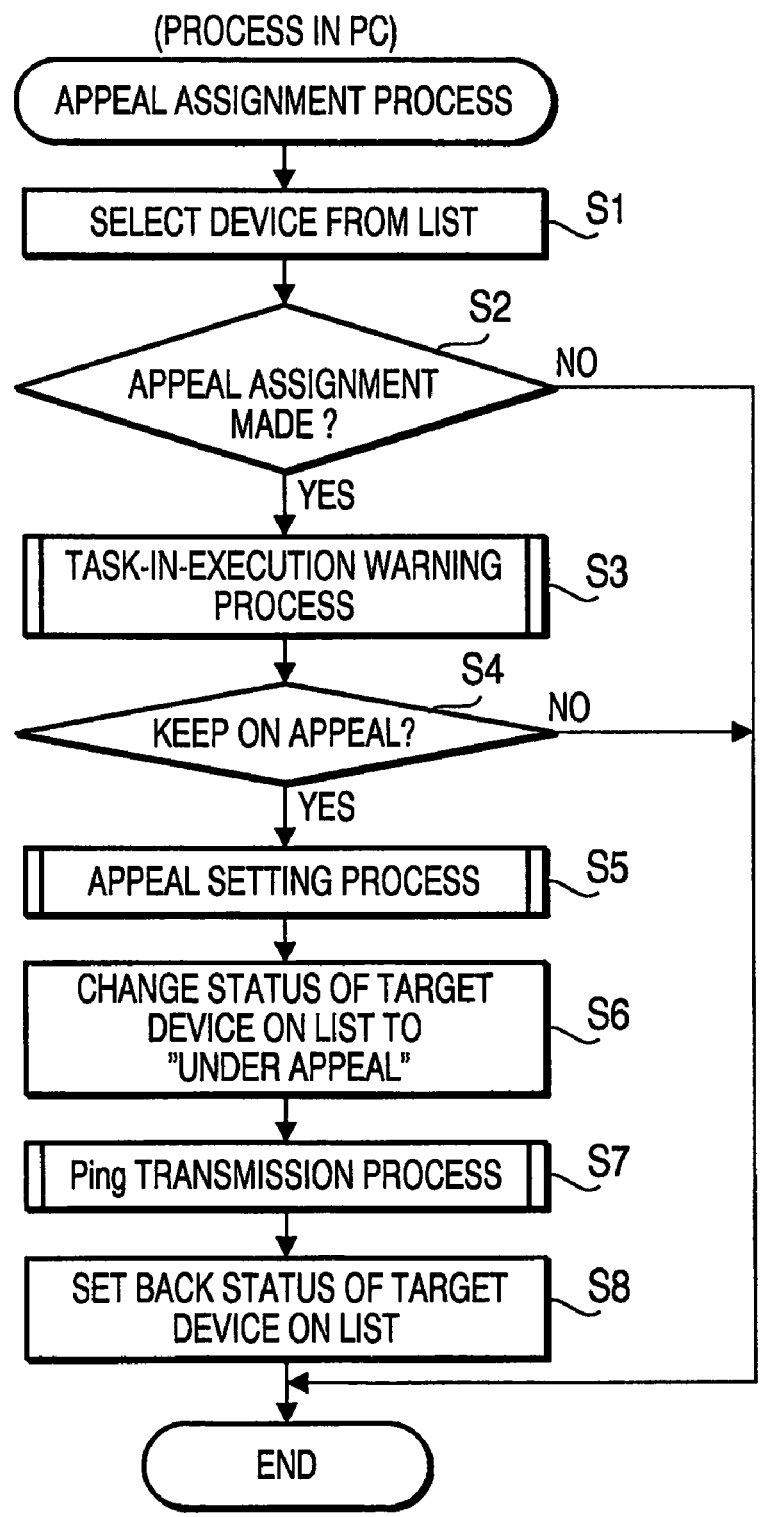
FIG. 2 is a flowchart showing an appeal assignment process executed by a PC according to at least one aspect of the invention.

In an appeal assignment process in FIG. 2, according to an operation by the user of the PC 10, a specified device, which is a target device whose location is to be confirmed, is selected among the printers 20 and MFCs 30 displayed on the list (S1). When an appeal assignment (i.e., an assignment for making the selected device inform of the location thereof such that the user can confirm the location) is made through an interface shown in FIG. 13B (S2: Yes), and a task-in-execution warning process is started (S3). In the step of S2, when the appeal assignment is not sent (S2: No), this process is terminated.

Figure 3:
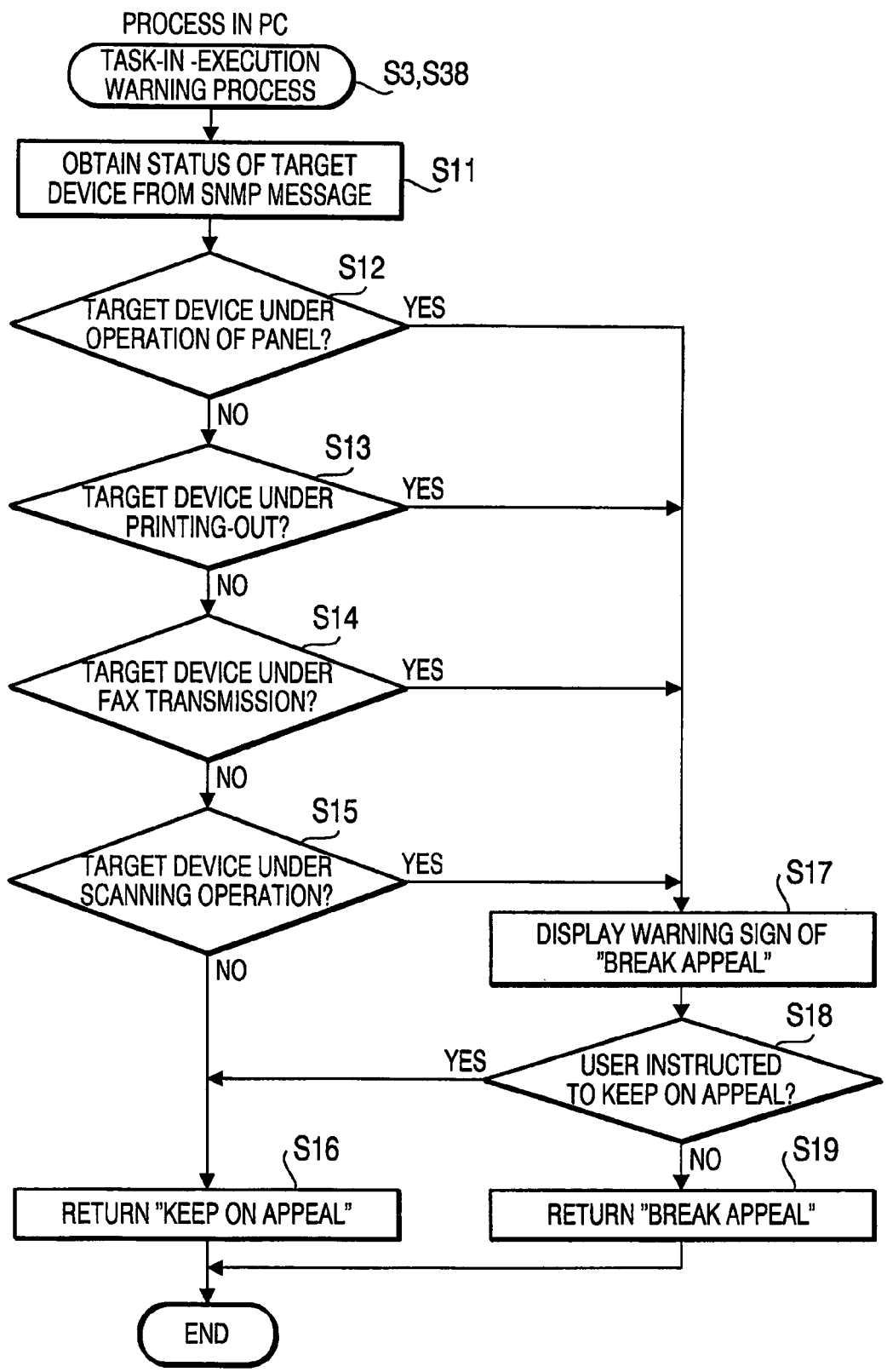
FIG. 3 is a flowchart showing a task-in-execution warning process executed by the PC according to at least one aspect of the invention.

Here, referring to FIG. 3, the task-in-execution warning process (S3) will be described. FIG. 3 is a flowchart showing the task-in-execution warning process. This process, which is executed when the appeal assignment is started and while the appeal assignment is being made, is a process for checking the status of the selected specified device and then confirming with the user of the PC 10 whether he continues the appeal assignment. A display image of the printer 20 or the MFC 30, which is a target device whose location is to be confirmed, is changed by the appeal assignment. Accordingly, when the specified device performs a predetermined operation, the display image of the specified device is allowed to correspond to the operation in execution by breaking the appeal assignment.

In the task-in-execution warning process, first, the PC 10 obtains the status of the target device (specified device) from the SNMP message (S11). When the obtained status is not "under operation of the panel" (under operation of the operating keys 24) (S12: No), not "under printing-out" (S13: No), not "under facsimile transmission" (S14: No), and not "under scanning operation" (S15: No), namely, the specified device is not in execution of any operation, the PC 10 returns "Keep on Appeal" as a return value of the process (S16).

On the other hand, when the status of the target device (specified device), which is obtained in S11, is any one of the statuses of "under operation of the panel (under operation of the operating keys 24) (S12: Yes), "under printing-out" (S13: Yes), "under facsimile transmission" (S14: Yes), and "under scanning operation" (S15: Yes), namely, the specified device is in execution of a predetermined operation, the PC 10 controls the LCD 16 to display a warning sign for inducing to break the informing operation (appeal) "Break Appeal?" (S17). When the user of the PC 10 instructs to keep on the informing operation (appeal) in reaction to the displayed warning sign (S18: Yes), the PC 10 returns the return value of "Keep on Appeal" (S16). When the user of the PC 10 does not instruct to keep on the informing operation (appeal) in reaction to the displayed warning sign (S18: No), the PC 10 returns a return value of "Break Appeal" (S19).

FIG. 2 is referred to again here. After the task-in-execution warning process (S3), if the return value is "Break Appeal" (S4: No), the process will be terminated. Meanwhile, if the return value is "Keep on Appeal" (S4: Yes), an appeal setting process will be executed (S5).

Figure 4:
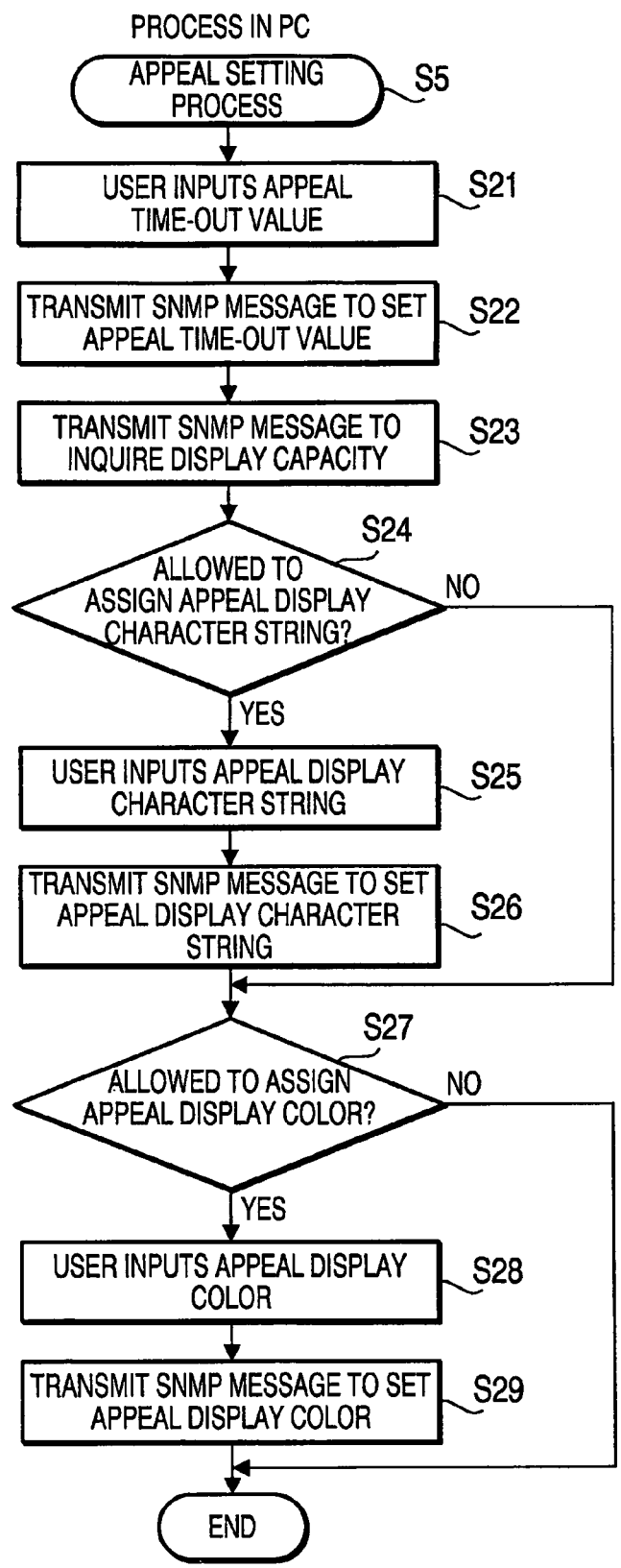
FIG. 4 is a flowchart showing an appeal setting process executed by the PC according to at least one aspect of the invention.

Here, with reference to FIG. 4, the appeal setting process (S5) will be explained. FIG. 4 is a flowchart showing the appeal setting process. In the appeal setting process, there are set the appeal execution time for a single transmission of Ping packet data (appeal time-out value), the display character string displayed on the specified device whose location is to be confirmed during the informing operation (appeal), and the display color that is a background color of the display.

In the appeal setting process, first, when the appeal time-out value is inputted by the user of the PC 10 (S21), the SNMP message for setting the appeal time-out value is transmitted to the specified device whose location is to be confirmed (S22).

Next, the SNMP message for inquiring a display capacity of the target device (specified device) is transmitted (S23). As a result of the inquiring operation, if it is allowed to assign the appeal display character string to the target device (specified device), that is, if the specified device can display the appeal display character string (S24: Yes), the PC 10 will induce the user thereof to input the appeal display character string (S25), and will transmit the inputted character string to the specified device with the SNMP message for setting the appeal display character string (S26). Meanwhile, as a result of the inquiring operation, if the specified device is unable to display the appeal display character string (S24: No), the steps of S25 and S26 will be skipped.

As a result of inquiring the display capacity of the target device (specified device) (S23), if it is allowed to assign the target device (specified device) to the appeal color, that is, if the specified device can change the background color of the display when the informing operation (appeal) is executed (S27: Yes), the PC 10 will induce the user thereof to input the appeal display color (S28), and will transmit the inputted color to the specified device with the SNMP message for setting the appeal display color (S29). Meanwhile, as a result of inquiring the display capacity, if the specified device is unable to change the background color (S27: No), the steps of S28 and S29 will be skipped.

It is noted that the appeal display character string may be displayed with a color set as the appeal display color during the informing operation (appeal). Namely, if any is displayed with a color set as the appeal display color, the background color of the display will not necessarily have to be changed to the color.

FIG. 2 is referred to again here. After execution of the appeal setting process (S5), the status 133 of the target device (specified device) on the list displayed on the LCD 16 is changed to a status of "under the informing operation (appeal)" (S6). By this process, the display image of the LCD 16 is changed to a state as shown in FIG. 13C. According to this aspect, there is shown an example where "Accessed by Management Tool!" is set as the appeal display character string, and a color of red is set as the appeal display color. Accordingly, white characters "Accessed by Management Tool!" are displayed on a red background as the status 133 of the specified device. Thus, when the appeal assignment is executed, the same display image as that of the target device (specified device) is shown on the management side, i.e., the PC 10. This can make it easier to allow the PC 10 to confirm the location of the specified device.

Figure 5:
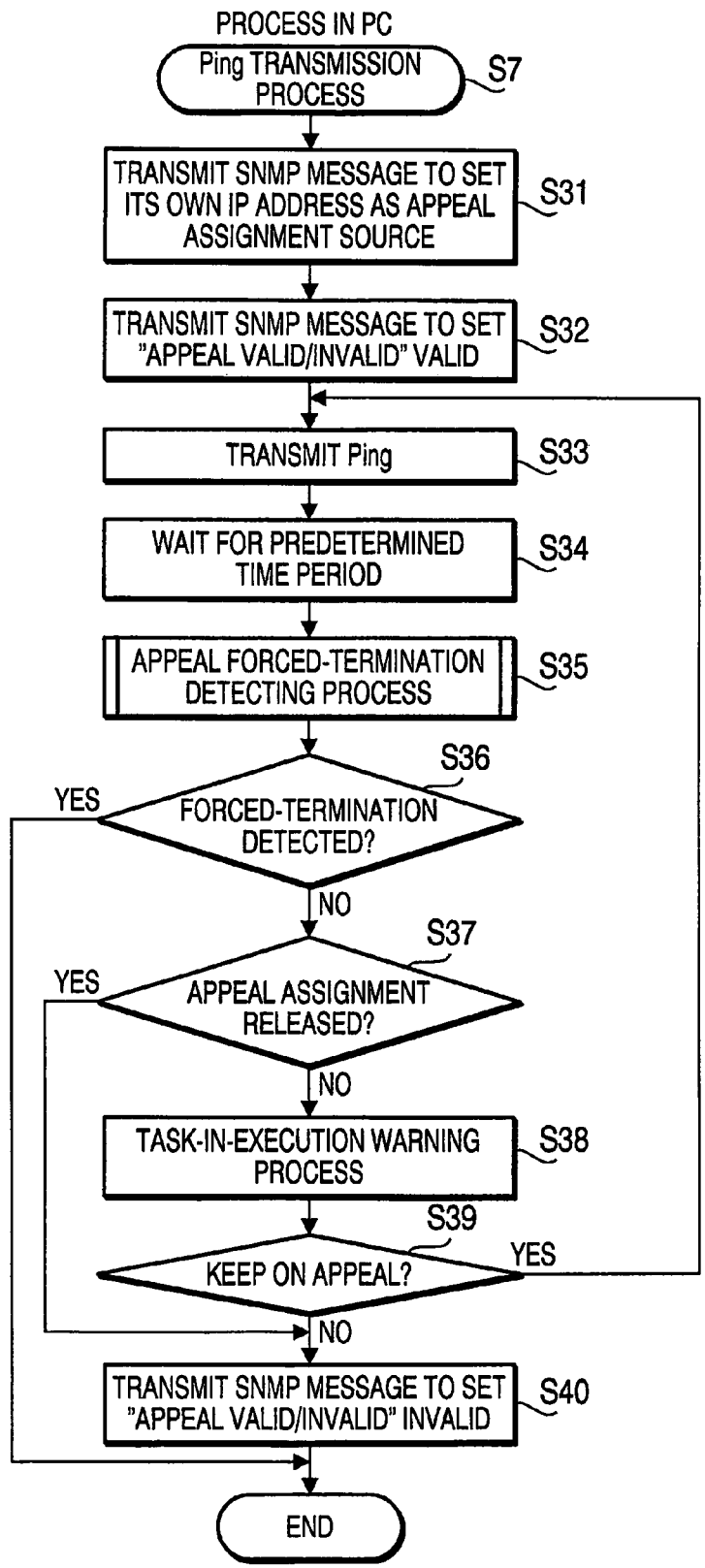
FIG. 5 is a flowchart showing a Ping transmission process executed by the PC according to at least one aspect of the invention.

After changing the display image of the LCD 16, Ping transmission process is carried out (S7). Here, the Ping transmission process is explained with reference to FIG. 5. FIG. 5 is a flowchart showing the Ping transmission process. In the Ping transmission process, the PC 10 sends the Ping packet data to the target device (specified device) selected by the user of the PC 10 to make the specified device execute the informing operation (appeal).

In the Ping transmission process, first, the PC 10 transmits the SNMP message for setting its own IP address stored in the IP address memory 13b as an appeal assignment source to the specified device (S31). Thereby, the specified device is set to perform the informing operation (appeal) for informing of the location thereof with the display image responsive only to the appeal assignment from the PC 10 (only to the transmission of the Ping packet data). Next, the PC 10 sends the SNMP message for setting "Appeal valid/invalid" valid to the specified device (S32). Thereby, the specified device is set in such a state that the informing operation (appeal) can be performed responsive to the appeal assignment from the PC 10. Thereafter, the PC 10 transmits the Ping packet data to the target device (specified device) (S33), and, after waiting for a predetermined time period, an appeal forced-termination detecting process is executed (S35).

Figure 6:
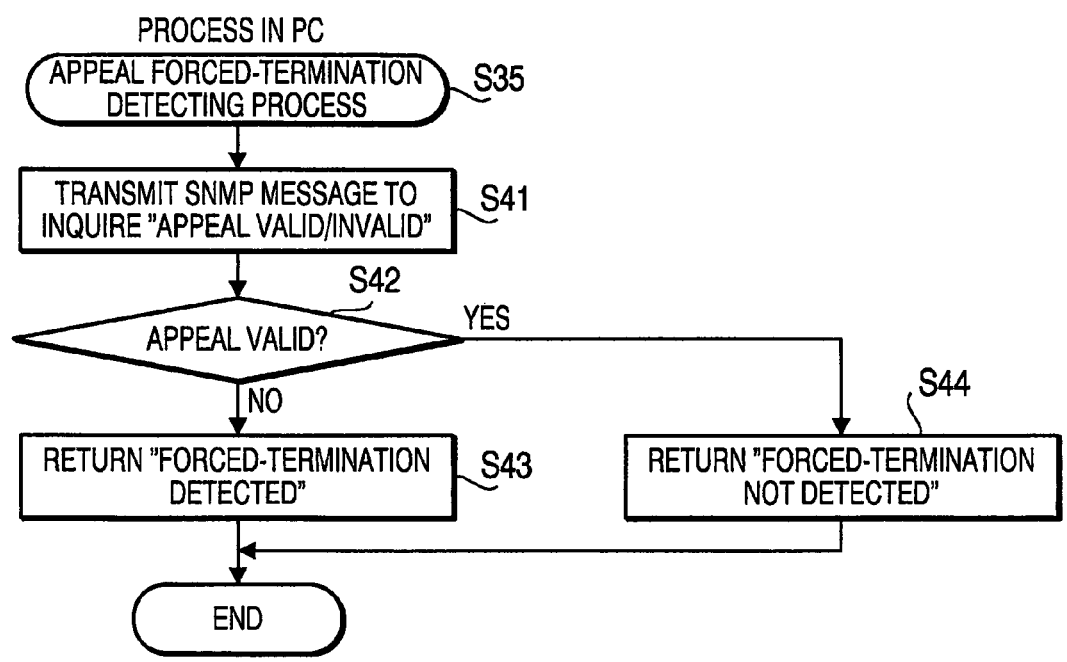
FIG. 6 is a flowchart showing an appeal forced-termination detecting process executed by the PC according to at least one aspect of the invention.

Here, referring to FIG. 6, the appeal forced-termination detecting process will be described. FIG. 6 is a flowchart showing the appeal forced-termination detecting process. The appeal forced-termination detecting process is such a process as to judge whether the target device (specified device) is in a state of being able to perform the informing operation (appeal) and whether the specified device is performing the informing operation (appeal), and as to return the judged result as a return value. When the operating keys 24 and 34 are operated by the user of the specified device, or when the execution time of the informing operation (appeal) exceeds the appeal time-out value, the informing operation (appeal) performed by the specified device is terminated, and the specified device is set in such a state that the informing operation (appeal) cannot be performed.

First, the PC 10 sends to the specified device the SNMP message for inquiring whether the informing operation (appeal) is valid or invalid (S41). As a result of the inquiring operation, if the informing operation (appeal) is valid (S42: Yes), the PC 10 returns a return value of "Forced-Termination Not Detected" (S44). If the informing operation (appeal) is invalid (S42: No), the PC 10 returns a return value of "Forced-Termination Detected" (S43).

FIG. 5 is referred to again here. As a result of the appeal forced-termination detecting process (S35), if the return value is "Forced-Termination Detected" (S36: Yes), the Ping transmission process will be terminated. The list displayed on the LCD 16 will be set back in the state as shown in FIG. 13A in the step of S8 in FIG. 2, and the series of appeal assignment process is terminated.

As a result of the appeal forced-termination detecting process (S35), if the return value is "Forced-Termination Not Detected" (S36: No), the user of the PC 10 will judge whether the PC 10, which had issued the appeal assignment, has released the appeal assignment (S37). If the appeal assignment has not been released (S37: No), the aforementioned task-in-execution warning process shown in FIG. 3 will be executed (S38). As a result of the task-in-execution warning process, if the PC 10 receives the return value of "Keep on Appeal" (S39: Yes), the PC 10 will get the process back to S33 to send again the Ping packet data, and repeat the above-mentioned process. Thus, the PC 10 keeps sending Ping packet data to the specified device in execution of the appeal assignment.

On the other hand, when the appeal assignment is released by the user of the PC 10 (S37: Yes), or when the return value of "Break Appeal" is received by the user of the PC 10 as a result of the task-in-execution warning process (S39: No), the process goes forward to S40 to send the SNMP message for setting the "Appeal valid/invalid" invalid to the specified device (S40), and the informing operation (appeal) by the specified device is ended. Thereafter, in the step of S8 in FIG. 2, the list displayed on the LCD 16 is set back in the state as shown in FIG. 13A (S8), and the series of appeal assignment process is terminated.

Figure 7:
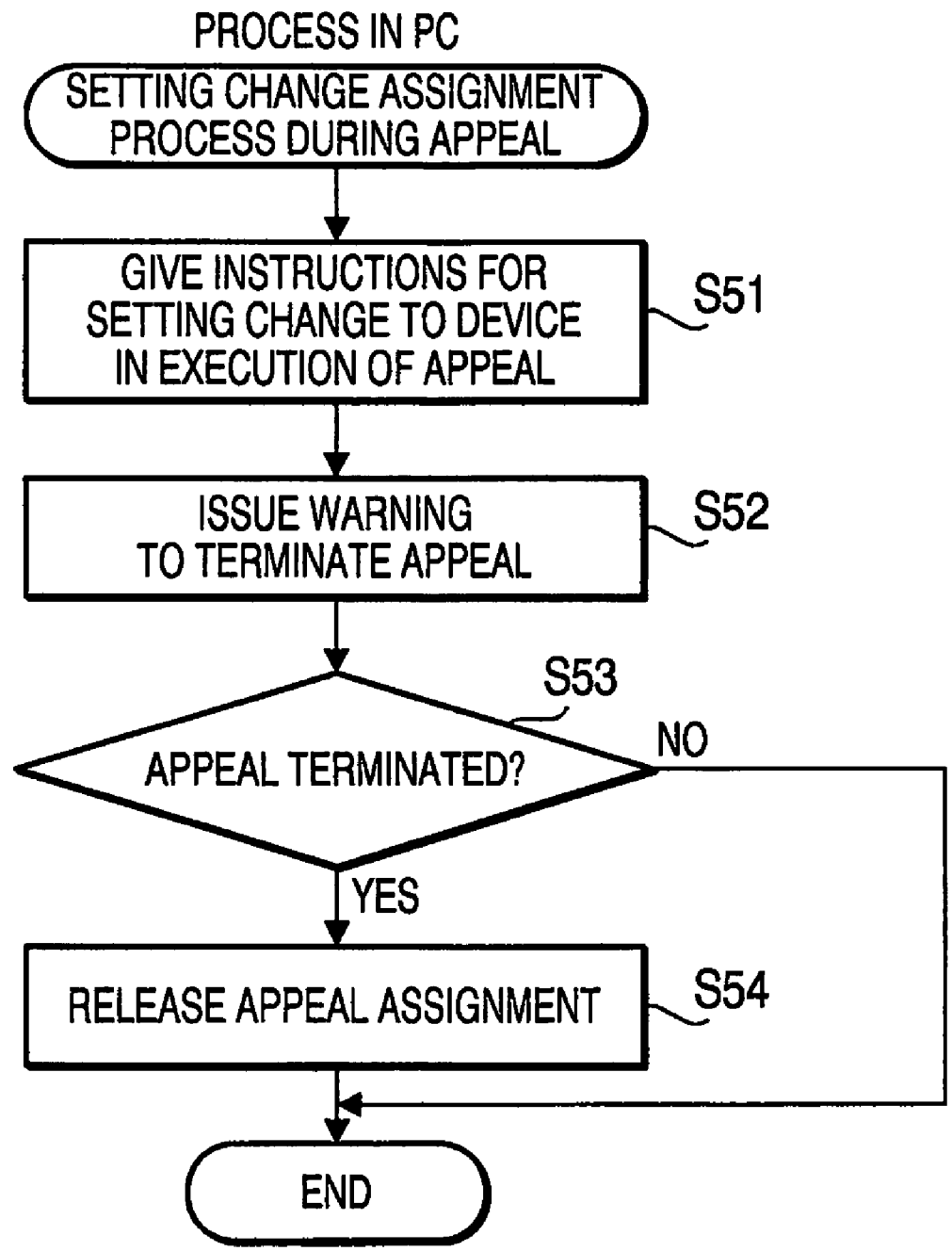
FIG. 7 is a flowchart showing a setting change assignment process, in execution of an informing operation (appeal), executed by the PC according to at least one aspect of the invention.

FIG. 7 is a flowchart showing a setting change assignment process during the informing operation (appeal). This process is executed when instructions for setting a print format or print-out is given to the specified device for which the appeal assignment is intended.

First, when the PC 10, which has executed the appeal assignment, gives some sort of instructions for changing the setting to the specified device that is a target for the appeal assignment (S51), a warning sign for inducing to terminate the appeal assignment is displayed on the LCD 16 (S52). When the user of the PC 10, who has seen the warning sign displayed, instructs to terminate the informing operation (appeal) (S53: Yes), the PC 10 releases the appeal assignment to end the series of appeal assignment process described with reference to FIGS. 2 to 6 (S54). The display screen of the LCD 16 is set back in the state as shown FIG. 13A by the termination of the appeal assignment. It is noted that even though the warning sign for inducing termination of the appeal assignment is displayed on the LCD 16, unless the user of the PC 10 releases the appeal assignment (S53: No), the appeal assignment will be continued with the process in S54 being skipped.

Thus, when instructions for setting a print format or print-out is given to the specified device that is a target for the appeal assignment, the PC 10 induces release of the appeal assignment in execution. This is performed in the case where the location of the specified device has been confirmed by the user of the PC 10, and thereafter, the specified device is operated through the PC 10. Therefore, in such a case, the role of the informing operation (appeal) (that is, to make the user confirm the location of the specified device) has already been played, and it is in such a state that the user of the PC 10 fails to give an instruction for terminating the informing operation (appeal). For this reason, the warning sign for inducing termination of the appeal assignment is displayed, so as to make the user of the PC 10 terminate the appeal assignment.

Next, referring to FIGS. 8 to 12, control operations executed by the specified device that is to inform of its location to be confirmed will be described. Control operations, shown in flowcharts of FIGS. 8 to 12, are executed by the target devices selected as the specified devices among the printers 20 and MFCs 30 by the PC 10. In this illustrative aspect, the control operations will be explained with an example of the printer 20 selected as the specified device.

Figure 8:
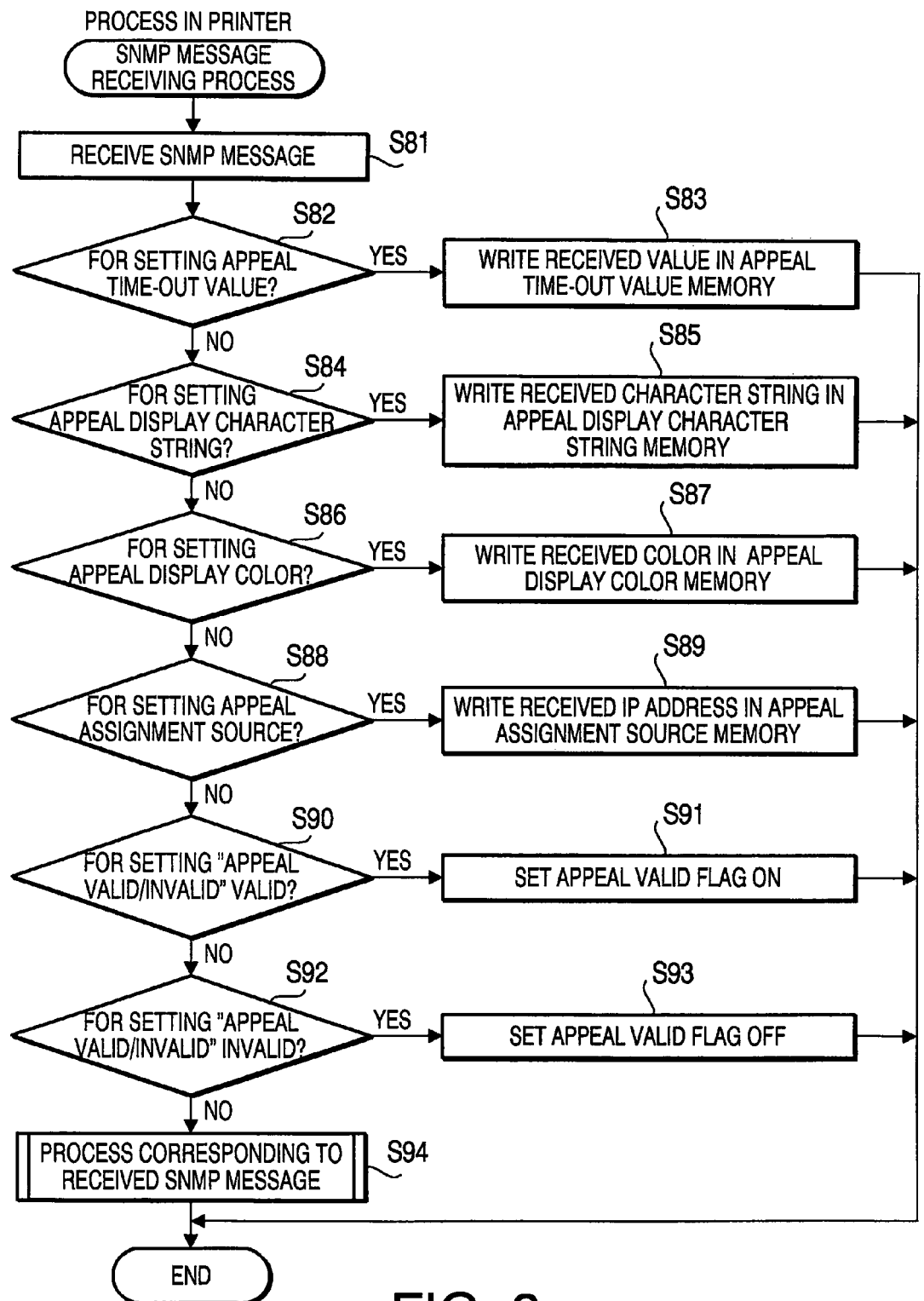
FIG. 8 is a flowchart showing an SNMP message receiving process executed by a printer as a target device for confirming its location according to at least one aspect of the invention.

FIG. 8 is a flowchart showing an SNMP message receiving process. This process is performed when the printer 20 receives the SNMP message whose destination is its own IP address stored in the IP address memory 23*a*.

First, the printer 20 receives the SNMP message (S81). When the received SNMP message is for setting the appeal time-out value (S82: Yes), the received value is written in the appeal time-out value memory 23*b* (S83), and the process is then terminated. When the received message is not for setting the appeal time-out value (S82: No), but for setting the appeal display character string (S84: Yes), the received character string is written in the appeal display character string memory 23*c* (S85), and the process is then terminated. When the received SNMP message is not for setting the appeal display character string (S84: No), but for setting the appeal display color (S86: Yes), the received color is written in the appeal display color memory 23*d* (S87), and the process is then terminated.

When the received SNMP message is not for setting the appeal display color (S86: No), but for setting the appeal assignment source device (S88: Yes), the received IP address is written in the appeal assignment source memory 23*e* (S89), and the process is then terminated. When the received SNMP message is not for setting the appeal assignment source (S88: No), but for setting the "Appeal valid/invalid" valid (S90: Yes), the appeal valid flag 23*f* is set ON (S91), and the process is then terminated. When the received SNMP message is not for setting the "Appeal valid/invalid" valid (S90: No), but for setting the "Appeal valid/invalid" invalid (S92: Yes), the appeal valid flag is set OFF (S93), and the process is then terminated. Further, when the received SNMP message is not for setting the "Appeal valid/invalid" invalid (S92: No), a process corresponding to the received SNMP message is carried out (S94), and the process is then terminated.

Figure 9:
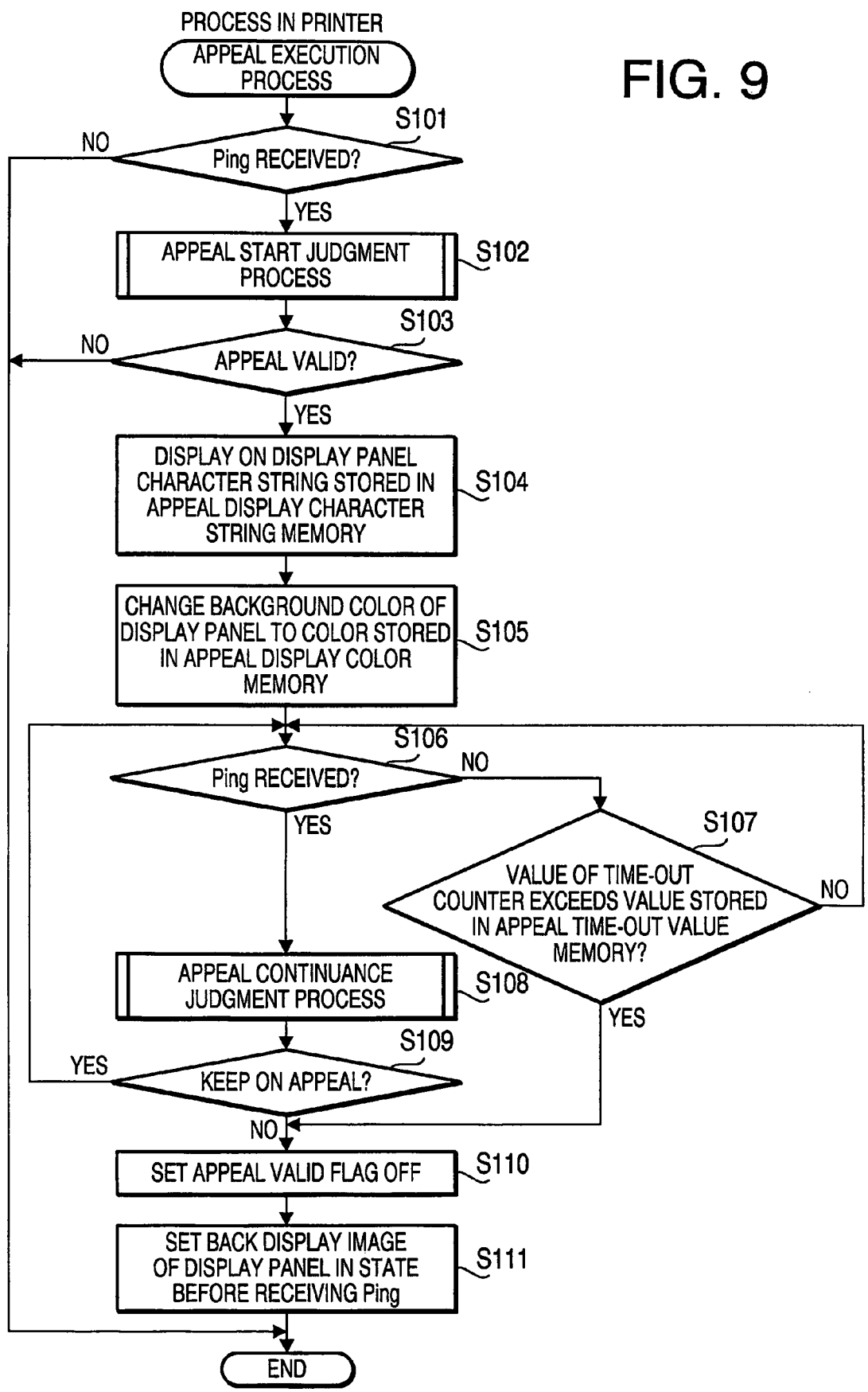
FIG. 9 is a flowchart showing an appeal execution process executed by the printer as the specified device according to at least one aspect of the invention.

FIG. 9 is a flowchart showing an appeal execution process performed by the printer 20 as the specified device. In the appeal execution process, first, the printer 20 judges whether it has received the Ping packet data (S 101). If the printer 20 has not received the Ping packet data (S101: No), the process will be ended. Meanwhile, if the printer 20 has received the Ping packet data (S101: Yes), the printer 20 will perform an appeal start judgment process (S102), so as to judge whether the informing operation (appeal) for informing of its location to be confirmed can be performed.

Figure 10:
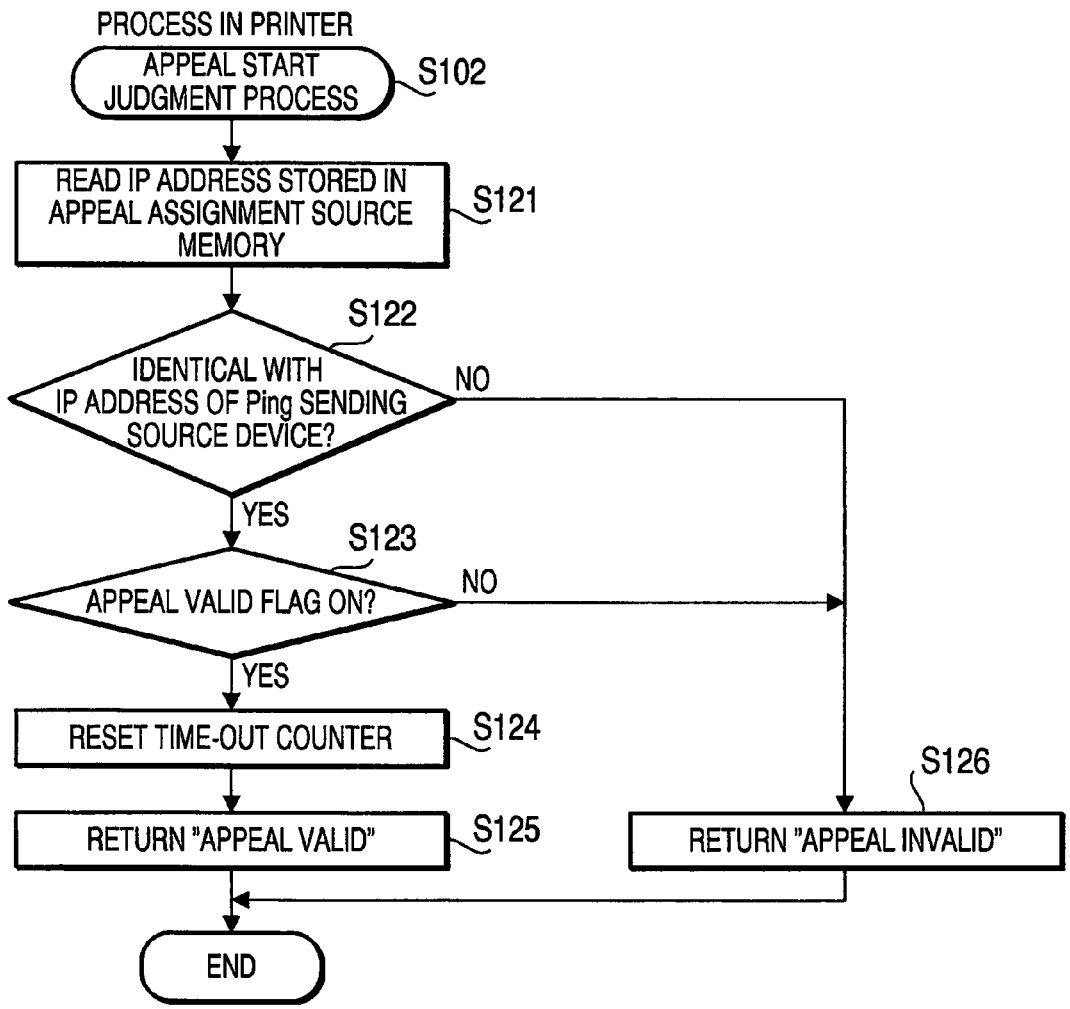
FIG. 10 is a flowchart showing an appeal start judgment process executed by the printer as the specified device according to at least one aspect of the invention.

Here, referring to FIG. 10, the appeal start judgment process will be explained. FIG. 10 is a flowchart showing the appeal start judgment process. The appeal start judgment process is a process for judging whether the informing operation (appeal) for informing of the location of the printer 20 to be confirmed can be performed based upon the received Ping packet data.

First, the printer 20 read the IP address stored in the appeal assignment source memory 23e (S121), and judge whether the IP address is identical with that of a sending source device of the Ping packet data (S122). If the IP address is identical with that of the sending source device of the Ping packet data (S122: Yes), the printer 20 will judge whether the appeal valid flag 23f is set ON (S123). If the appeal valid flag is set ON (S123: Yes), the printer 20 will reset the value of a time-out counter (S124), and will return "Appeal Valid" as a return value of the process (S125).

On the other hand, if the IP address does not conform with that of the sending source device of the Ping Packet data (S122: No), since the appeal assignment cannot be made responsive to the Ping Packet data, the printer 20 will return "Appeal Invalid" as the return value of the process (S126). This is due to the following reason: Since the appeal display character string and/or the appeal display color are set when the informing operation (appeal) is executed, the printer 20 is configured to perform the informing operation (appeal) according to the assignment from a device that has configured the settings. In addition, even though the IP address is identical with that of the sending source device of the Ping packet data (S121: Yes), the printer 20 will return "Appeal Invalid" as the return value (S126), since the appeal assignment cannot be made in the case where the appeal valid flag 23f is set OFF (S123: No).

FIG. 9 is referred to again here. If the return value in the appeal start judgment process (S102) is "Appeal Invalid" (S103: No), the informing operation (appeal) cannot be started. Therefore, this process is terminated in such a case. Meanwhile, if the return value in the appeal start judgment process (S102) is "Appeal Valid" (S103: Yes), the informing operation (appeal) for making the user of the PC 10 confirm the location of the printer 20 will be executed. In other words, the character string stored in the appeal display character string memory 23c is displayed on the display panel 25 (S104), and the background color of the display panel 25 is changed to the color stored in the appeal display color memory 23d (S105). Thereby, the display image of the printer 20 selected as the specified device is changed, so as to inform of the location of the printer 20. A display state of the printer 20 in the above-mentioned informing process is shown in FIG. 13D. In this illustrative aspect, there is shown an example where "Accessed by Management Tool!" and a color of red are set as the appeal display character string and the appeal display color, respectively. In this case, the character string "Accessed by Management Tool!" is displayed as white colored characters on a red colored background on the display panel 25. Since the aforementioned display image of the printer 20 corresponds to a display image of the PC 10 that gives the appeal assignment, it is possible to make the user of the PC 10 exactly confirm the printer 20 that is informing of its location.

After that, the printer 20 confirms again whether it has received the Ping packet data (S106). If the printer 20 has not received the Ping packet data (S106: No), the printer 20 will judges whether the value of the time-out counter, which measures the execution time of the informing operation (appeal), exceeds the value stored in the appeal time-out value memory 23b (S107). As a result of the judgment, if the measure time is not greater than the value stored in the appeal time-out value memory 23b (S107: No), the printer 20 will shift the process to the step of S106 to wait for receiving the Ping packet data. In the meanwhile, if the measured time is over the value stored in the appeal time-out value memory 23b (S107: Yes), the printer 20 will proceed the process to S110 to set the appeal valid flag 23f OFF (S110). Then, the printer 20 sets back the display image of the display panel 25 in the state before having received the Ping packet data (S111), and ends the informing operation (appeal). Thereby, even though the printer 20 receives no instructions for some sort of operation from the PC 10, the informing operation (appeal) can be automatically terminated when the time stored in the appeal time-out value memory 23b has elapsed.

Figure 11:
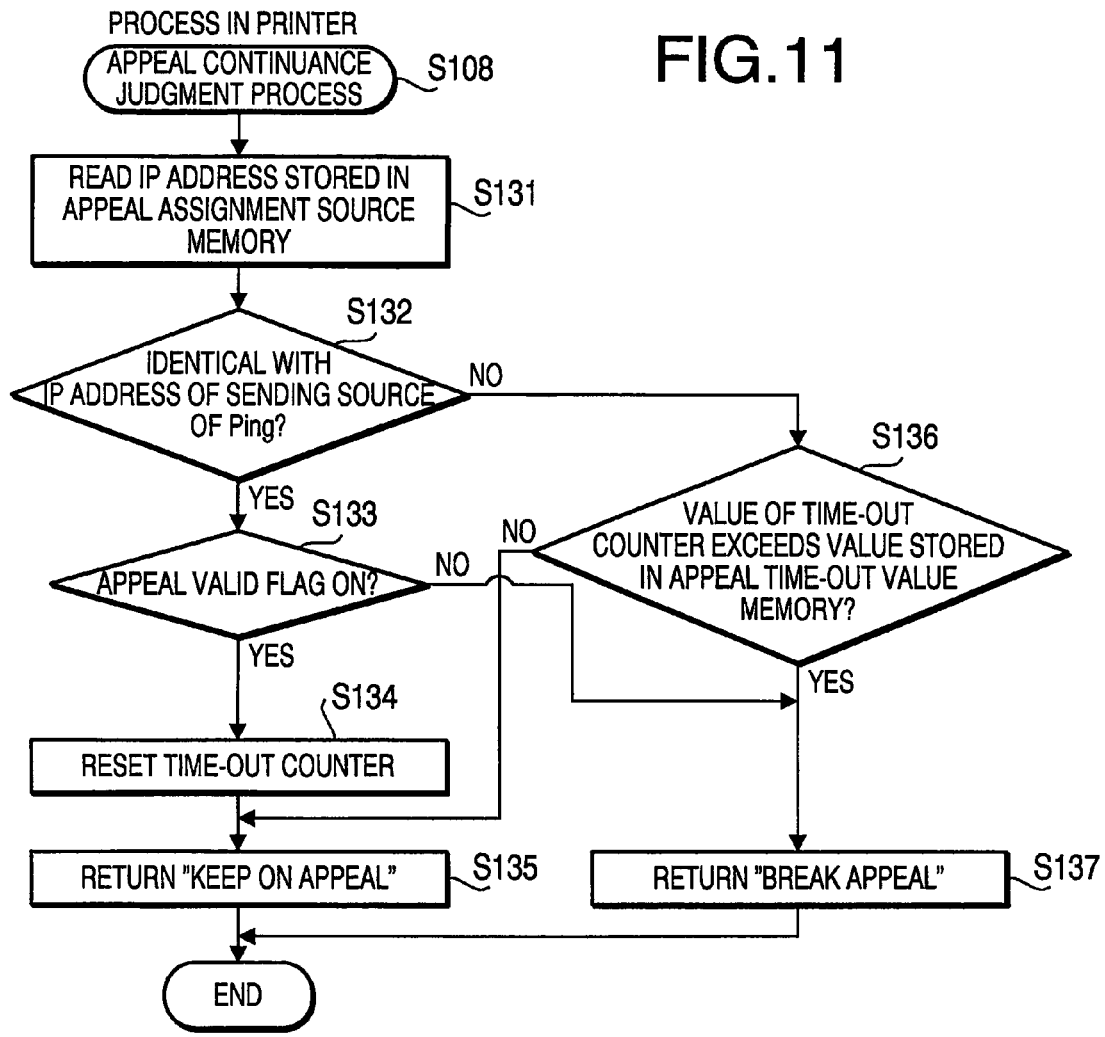
FIG. 11 is a flowchart showing an appeal continuance judgment process executed by the printer as the specified device according to at least one aspect of the invention.

If the printer 20 confirms to receive the Ping packet data (S106: Yes), an appeal continuance judgment process will be executed (S108). The appeal continuance judgment process (S108) will be explained herein with reference to FIG. 11. FIG. 11 is a flowchart showing the appeal continuance judgment process. The appeal continuance judgment process is a process that is executed when the printer 20 has received the Ping packet data during the informing operation (appeal), and in this process, it is judged whether the informing operation (appeal) is to be continued.

First, the printer 20 reads the IP address stored in the appeal assignment source memory 23e (S131). The printer 20 then judges whether the IP address is identical with that of the sending source device of the Ping packet data (S132). If the IP address is identical with that of the sending source device (S132: Yes), the printer 20 will judge whether the appeal valid flag 23f is set ON (S133). If the appeal valid flag 23f is set ON (S133: Yes), the printer 20 will reset the value of the time-out counter that measures the execution time of the informing operation (appeal) (S134) to return "Keep on Appeal" as a return value of the process (S135). Thereby, the informing operation (appeal) is further executed by the time stored in the appeal time-out value memory 23b.

On the other hand, if the IP address is not identical with that of the sending source device of the Ping packet data (S132: No), the printer 20 will judge whether the value of the time-out counter, which measures the execution time of the informing operation (appeal), exceeds the value stored in the appeal time-out value memory 23b (S136). As a result of the judgment, if the measured time is not greater than the value stored in the appeal time-out value memory 23b (S136: No), the printer 20 will return "Keep on Appeal" as the return value of the process (S135). If the measured time is greater than the value stored in the appeal time-out value memory 23b (S136: Yes), the printer 20 will return "Break Appeal" as the return value of the process (S137).

FIG. 9 is referred to again here. As a result of execution of the appeal continuation judgment process (S108), if the return value is "Keep on Appeal" (S109: Yes), the printer 20 will shift the process to S106 to repeat the aforementioned process. Meanwhile, if the return value of the appeal continuation judgment process (S108) is "Break Appeal" (S109: No), the printer 20 will set the appeal valid flag 23f OFF (S110), and set back the display image of the display panel 25 in the state before receiving the Ping packet data (S111) to terminate the informing operation (appeal).

Figure 12:
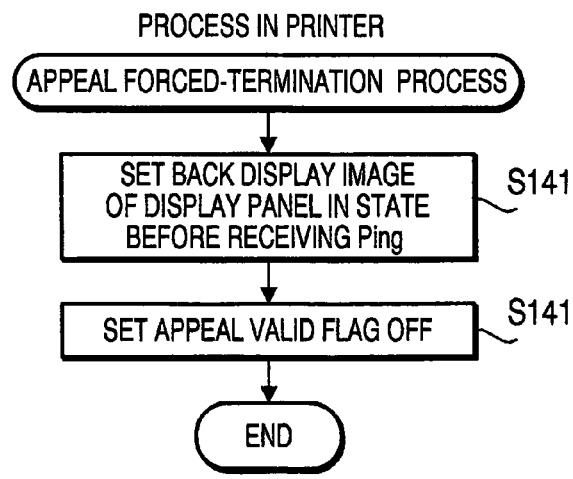
FIG. 12 is a flowchart showing an appeal forced-termination process executed by the printer as the specified device according to at least one aspect of the invention.

FIG. 12 is a flowchart showing an appeal forced-termination process. The appeal forced-termination process is a process to forced-terminate the informing operation (appeal) for informing of the location of the printer 20 to be confirmed, which is being executed by the printer 20 as the specified device. The appeal forced-termination process is executed when some sort of error or warning occurs, or the operating keys 24 are operated by the user of the printer 20.

In the appeal forced-termination process, the printer 20 sets back the display image of the display panel 25 in the state before receiving the Ping packet data (S141), and sets the appeal valid flag 23f off (S142) to forced-terminate the informing operation (appeal) in execution. When some sort of error or warning occurs, or the operating keys 24 are operated by the user of the printer 20, there are displayed on the display panel 25 of the printer 20 necessary matters, for instance, on what the current state of the printer 20 is or how the printer 20 is currently operated. As such a case, when the necessary matters, which should be displayed on the panel 25 of the printer 20, occurs, the necessary matters can be displayed by immediately terminating the appeal display as shown in FIG. 13D in the appeal forced-termination process.

It is noted that, by setting the appeal valid flag 23f OFF, the forced-termination of the informing operation (appeal) in the specified device is detected in the appeal forced-termination detecting process (S35), which is executed by the PC 10, shown in FIG. 6. Consequently, the appeal assignment in execution is terminated in the PC 10 (S36 in FIG. 5: Yes).

As aforementioned, according to the network system in the illustrative aspect first described, it is possible by changing the display image of the specified device to execute the informing operation (appeal) (i.e., an operation for informing of which the specified device displayed on the LCD 16 of the PC 10 is among the printers 20 and/or MFCs 30 connected to the LAN cable 1). Therefore, the user of the PC 10, after giving instructions for the appeal assignment, can confirm the location of the specified device only by going around visually confirming the displays of the printers 20 and MFCs 30. In addition, such an appeal display is shown in the same manner by both the PC 10 that assigns the informing operation (appeal) and the specified device. Accordingly, even though informing operations (appeals) are executed at the same time by PCs 10, the operations are allowed to exactly confirm the location of an intended specified device. It is noted that the informing operation (appeal) may be executed with a character string and/or background color being displayed, and also with a graphic form, such as an icon, being displayed. Moreover, the display color may be used not as the background color changing the whole display screen, but as a color changing a part of the character color and display screen.

Next, referring to FIGS. 14 to 21, a control operation for confirming a location of a specified device connected to a network system in another illustrative aspect. In the aforementioned aspects, during execution of the appeal assignment, the Ping packet data is repeatedly sent to the printer 20 as the specified device from the PC 10. While the Ping packet data is being repeatedly sent, the informing operation (appeal) is continued. On the contrary, according to this aspect, once an SNMP message for setting "Appeal ON/OFF" ON is transmitted to the specified device from a PC 10, the informing operation (appeal) is executed, and the informing operation (appeal) is then terminated after being continued for a time period stored in an appeal time-out value memory 23b. That is to say, unlike some other aspects, the SNMP message for executing the informing operation (appeal) is transmitted just once. It is noted that the same reference characters will be added to the same parts as those described before in the aspects described, and explanation on the same parts will be omitted. Only different parts will be described hereinafter.

FIG. 14 is a block diagram showing an electrical configuration of a network system according to an illustrative aspect. This illustrative aspect is different from the aforementioned illustrative in configurations of RAMs of a printer 20 and MFC 30.

The printer 20 and MFC 30 in this aspect have an appeal-in-execution flags 23g and 33g, respectively. The appeal-in-execution flags 23g and 33g are flags that represent that the printer 20 and MFC 30 are executing the informing operation (appeal), respectively. When the SNMP message for setting the "Appeal ON/OFF" ON is received, the appeal-in-execution flag 23g (33g) is set ON. When the SNMP message for setting the "Appeal ON/OFF" OFF is received, the appeal-in-execution flag 23g (33g) is set OFF. In addition, the appeal-in-execution flag 23g (33g) is set OFF, when the informing operation (appeal) is terminated as a result of the informing operation (appeal) being executed for the time period stored in the appeal time-out value memory 23b (33b). Further, the appeal-in-execution flag 23g (33g) is set OFF, when the informing operation (appeal) in execution is terminated by execution of the below-mentioned appeal forced-termination process 2 shown in FIG. 21.

Figure 15:
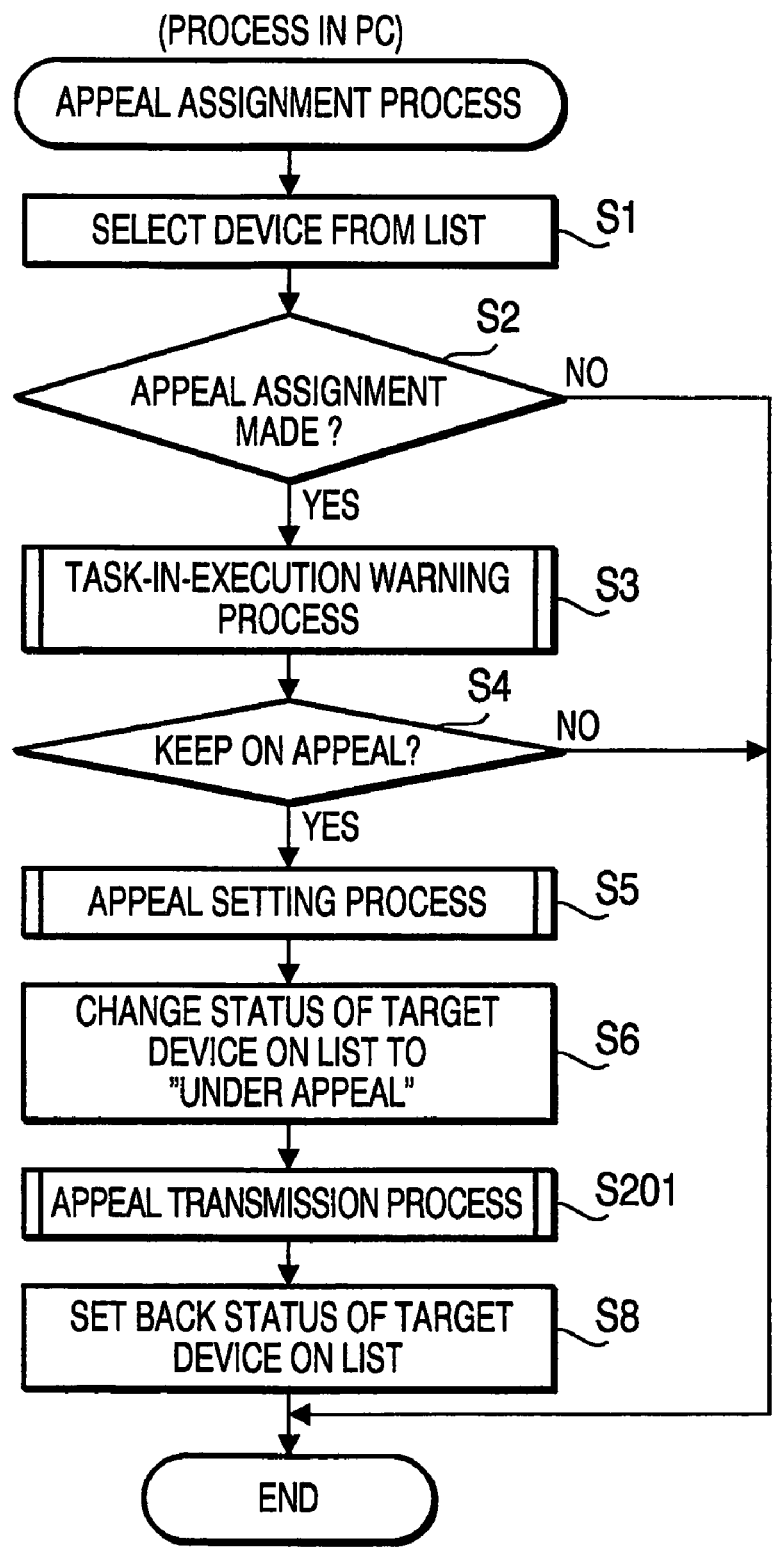
FIG. 15 is a flowchart showing an appeal assignment process executed by a PC according to at least one aspect of the invention.

Next, referring to FIGS. 15 to 17, processes executed by the PC 10 that assigns the informing operation (appeal) will be explained. When the management application program 14a is executed, first, an appeal assignment process is executed. Since processes in S1 to S6, and S8 in the appeal assignment process are the same as the aforementioned processes shown in FIG. 2 explanation on the processes will be omitted. After the appeal setting process has been executed (S5), and the display image of the LCD 16 has been changed into the state as shown in FIG. 13C (S6), an appeal transmitting process shown in FIG. 16 is executed (S201).

Figure 16:
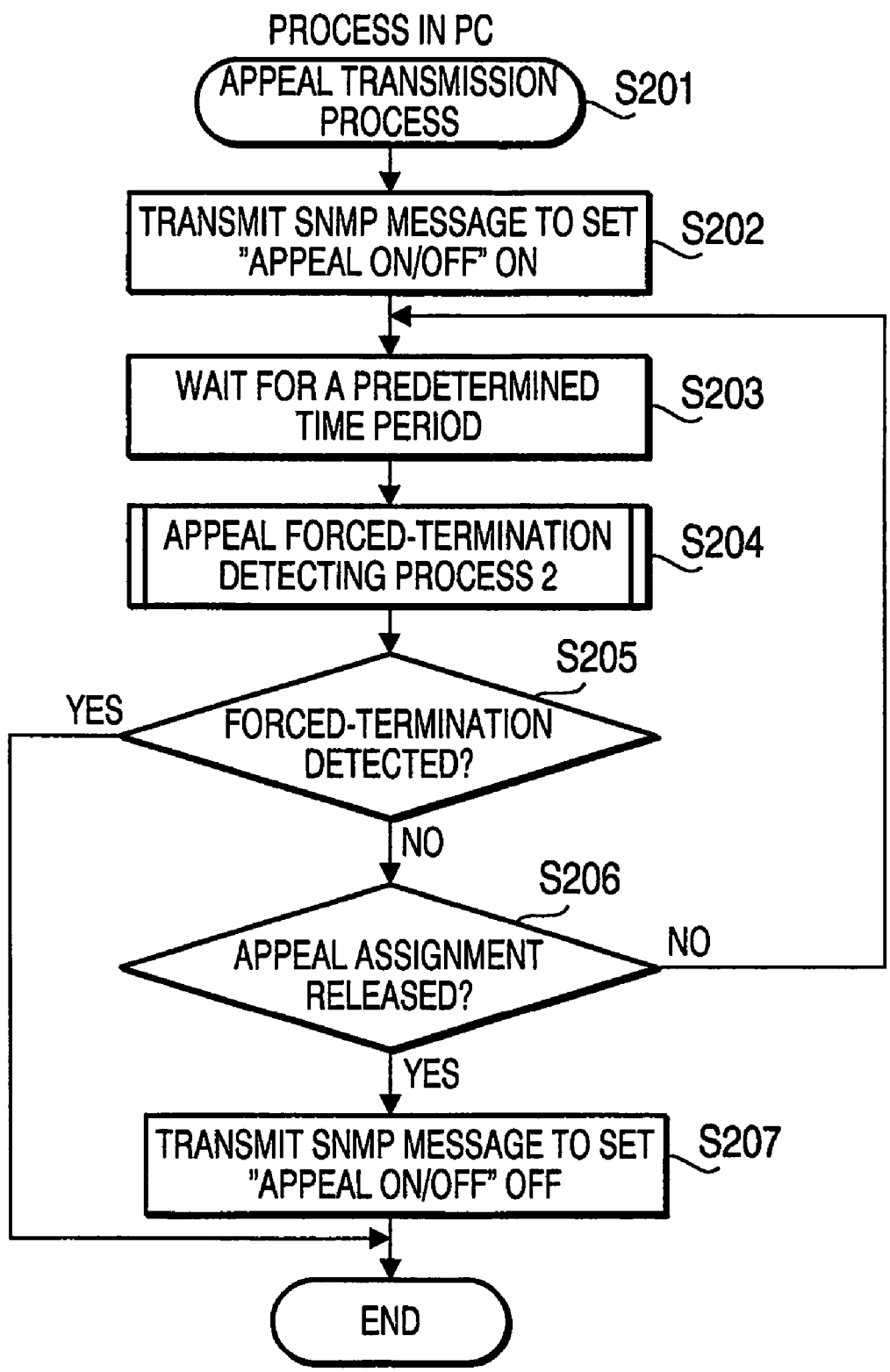
FIG. 16 is a flowchart showing an appeal transmission process executed by the PC according to at least one aspect of the invention.

FIG. 16 is a flowchart showing the appeal transmitting process according to an illustrative aspect of the invention. The appeal transmitting process is a process for transmitting the SNMP message for setting the "Appeal ON/OFF" ON to a target device (specified device) selected by a user of the PC 10 to make the specified device execute the informing operation (appeal).

In the appeal transmitting process, first, the PC 10 transmits the SNMP message for setting the "Appeal ON/OFF" ON to the target device that is to execute the informing operation (appeal), i.e., the specified device (S202). Thereafter, an appeal forced-termination detecting process 2 is executed (S204) after waiting for a predetermined time period (S203).

Here, with reference to FIG. 17, the appeal forced-termination detecting process 2 will be explained. FIG. 17 is a flowchart showing the appeal forced-termination detecting process. In the appeal forced-termination detecting process, first, the PC 10 transmits the SNMP for inquiring whether the "Appeal ON/OFF" is ON or OFF to the target device (specified device) that is to execute the informing operation (appeal) (S211). As a result of the inquiring operation, when the informing operation (appeal) is continued in the target device (specified device), an "appeal ON" is returned. Meanwhile, when the informing operation (appeal) is terminated, an "appeal OFF" is returned. Accordingly, as a result of the inquiring operation, if the "Appeal ON/OFF" of the printer 20, which is the specified device, is set OFF (S212: No), "Forced-Termination Detected" will be returned as a return value of the process (S213). If the "Appeal ON/OFF" of the printer 20 is set ON (S212: Yes), "Forced-Termination Not Detected" will be returned as the return value of the process (S214).

FIG. 16 is referred to again here. As a result of the appeal forced-termination detecting process 2 in S204, if the PC 10 receives the return value of "Forced-Termination Detected" (S205: Yes), the PC 10 will end the process to terminate the appeal assignment. Thereby, the appeal assignment can be terminated in the PC 10 at the same time when the informing operation (appeal) is terminated in the printer 20 as the specified device.

On the other hand, as a result of the appeal forced-termination detecting process 2 in S204, when the PC 10 receives the return value "Forced-Termination Not Detected" (S205:

No), since the informing operation (appeal) is continuously being executed in the printer 20 as the specified device, in such a case, the user of the PC 10 confirms whether the appeal assignment is released (S206). If the appeal assignment is not released (S206: No), the process will go to S203, so that the aforementioned processes are repeated. If the appeal assignment is released by the user of the PC 10 (S206: Yes), the SNMP message for setting "Appeal ON/OFF" OFF will be transmitted to the specified device, i.e., the target device that is to execute the informing operation (appeal) (S207), so as to terminate the informing operation (appeal) in the printer 20 and the appeal assignment in the PC 10.

Next, referring to FIGS. 18 to 21, illustrative control operations executed by the specified device, which is to inform of its location to be confirmed, will be described. Control operations shown in flowcharts of FIGS. 18 to 21 are executed by the target device, which is selected by the PC 10 as the specified device among the printers 20 and/or MFCs 30 connected to the network system. In these aspects, detailed explanation will be given with an example in the case where the printer 20 is selected as the specified device.

Figure 18:
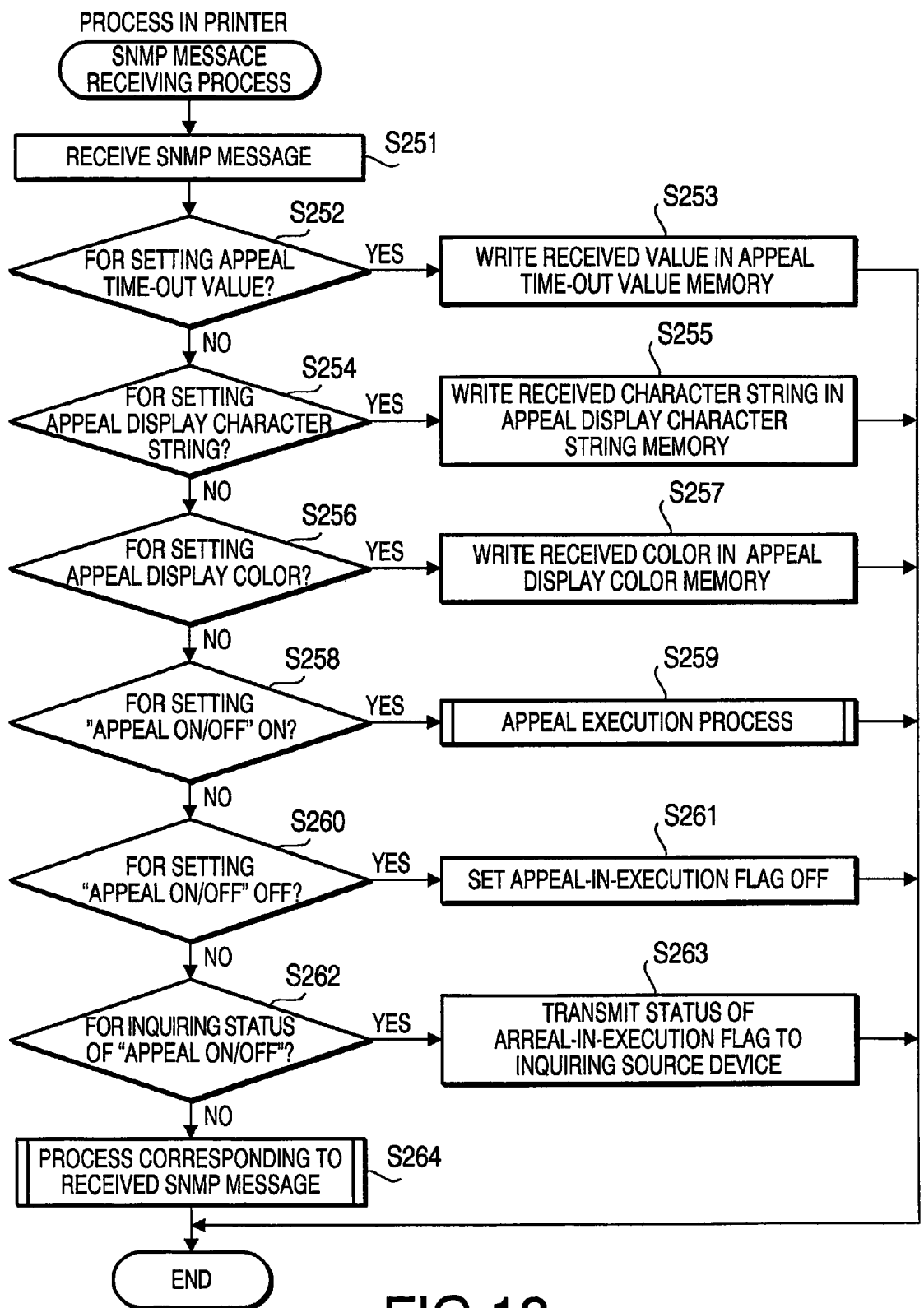
FIG. 18 is a flowchart showing an SNMP message receiving process executed by a printer as a target device for confirming its location according to at least one aspect of the invention.

FIG. 18 is a flowchart showing an SNMP message receiving process. The process is executed when the printer 20 receives the SNMP message whose destination is the IP address of the printer 20 that is stored in the IP address memory 23a.

First, the printer 20 receives the SNMP message (S251). If the received SNMP message is a message for setting the appeal time-out value (S252: Yes), the printer 20 will write the received value in the appeal time-out value memory 23b (S253) to terminate the process. If the received SNMP message is not for setting the appeal time-out value (S252: No), but for setting the appeal display character string (S254: Yes), the printer 20 will write the received character string in the appeal display character string memory 23c (S255) to terminate the process. If the received SNMP message is not for setting the appeal display character string (S254: No), but for setting the appeal display color (S256: Yes), the printer 20 will write the received color in the appeal display color memory 23d (S257) to terminate the process.

If the received SNMP message is not for setting the appeal display color (S256: No), but for setting the "Appeal ON/OFF" ON (S258: Yes), an appeal execution process shown in FIG. 19 will be executed (S259). The appeal execution process will be below-mentioned.

If the received SNMP message is not for setting the "Appeal ON/OFF" ON (S258: No), but for setting the "Appeal ON/OFF" OFF (S260: Yes), the printer 20 will set the appeal-in-execution flag 23g OFF (S261) to terminate the process. If the received SNMP message is not for setting the "Appeal ON/OFF" OFF (S260: No), but for inquiring a status of the "Appeal ON/OFF" (S262: Yes), the printer 20 will transmit the status of the appeal-in-execution flag 23g to the inquiring source device (S263). In addition, if the received SNMP message is not for inquiring the status of the "Appeal ON/OFF" (S262: No), the printer 20 will execute a process corresponding to the received SNMP message (S264) to terminate the process.

Figure 19:
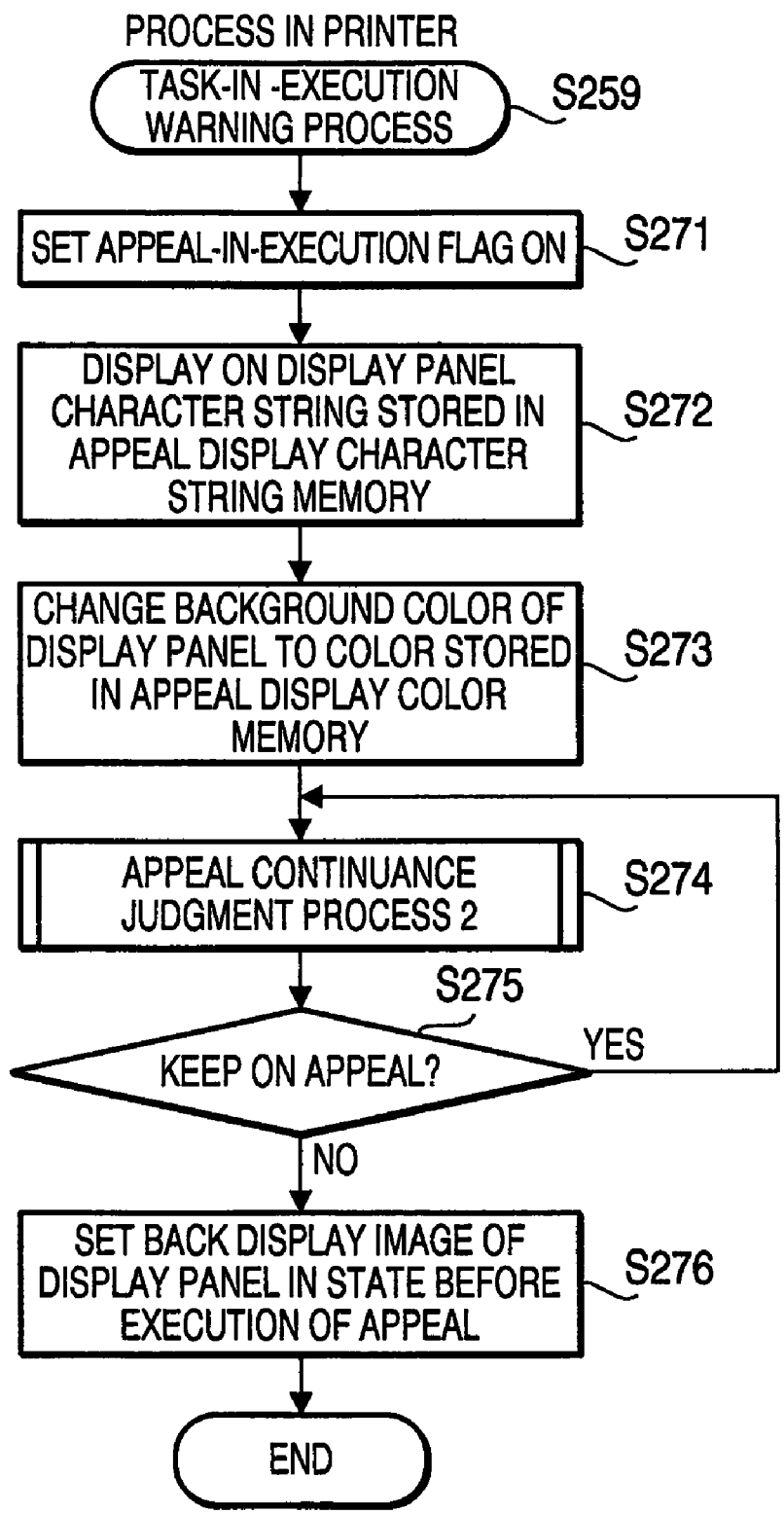
FIG. 19 is a flowchart showing an appeal execution process executed by the printer as the specified device according to at least one aspect of the invention.

The appeal execution process (S259) will be described with reference to FIG. 19. FIG. 19 is a flowchart showing the appeal execution process. As aforementioned, the appeal execution process is executed when the printer 20 receives the SNMP message for setting the "Appeal ON/OFF" ON.

In the appeal execution process, first, the appeal-in-execution flag 23g is set ON (S271). Then, the character string stored in the appeal display character string memory 23c is displayed on the display panel 25 (S272), and the background color of the display panel 25 is changed to the color stored in the appeal display color memory 23d (S273). Thereby, the display image of the printer 20 selected as the specified device is changed, so as to inform of the location of the printer 20 to be confirmed. An example of a display state in the informing operation is shown in FIG. 13D. In this aspect, there is shown an example where "Accessed by Management Tool!" is set as the appeal display character string and a color of red is set as the appeal display color. Accordingly, on the display panel 25, there is displayed the white-colored character string "Accessed by Management Tool!" on the red-colored background. Since this display image corresponds to that of the PC 10 that assigns the informing operation (appeal), it is allowed to exactly confirm the printer 20 that is informing of its location.

Figure 20:
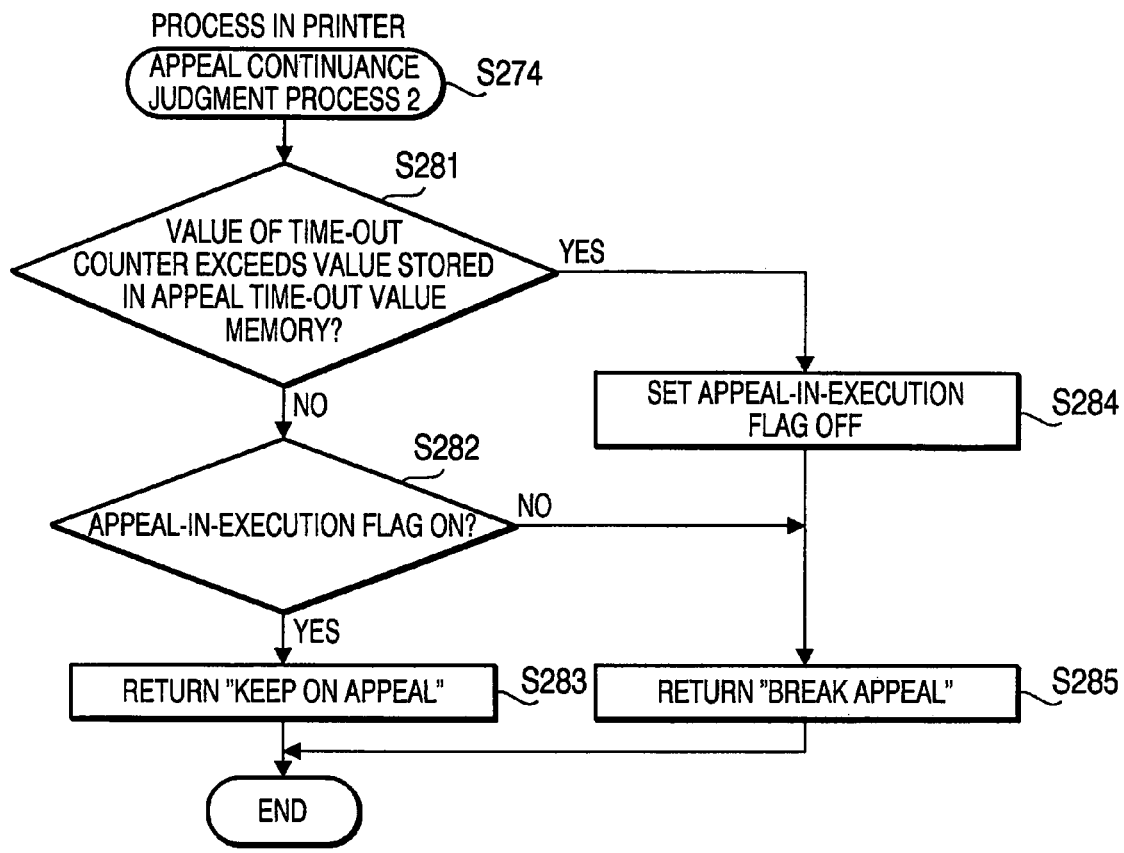
FIG. 20 is a flowchart showing an appeal continuance judgment process executed by the printer as the specified device according to at least one aspect of the invention.

Thereafter, an appeal continuation judgment process 2 is executed (S274). FIG. 20 is a flowchart showing the appeal continuation judgment process 2. In the appeal continuation judgment process 2, the printer 20 judges whether the value of the time-out counter that measures execution time of the informing operation (appeal) exceeds the value stored in the appeal time-out value memory 23b (S281). As a result of the judgment, if the measured time is not greater than the value stored in the appeal time-out value memory 23b (S281: No), the status of the appeal-in-execution flag 23g will be confirmed (S282). If the flag 23g is set ON (S282: Yes), since it means that the informing operation (appeal) is continued, "Keep on Appeal" will be returned as a return value of the process (S283). Meanwhile, as a result of confirming the status of the appeal-in-execution flag 23g, if the flag 23g is set OFF (S282: No), since it means that the informing operation (appeal) by the printer 20 has already been terminated, the return value of "Break Appeal" will be returned (S285).

In addition, in the process of S281, if the time measured by the time-out counter exceeds the value stored in the appeal time-out value memory 23b (S281: Yes), since it means time to terminate the informing operation (appeal) in execution, the printer 20 will set the appeal-in-execution flag 23g OFF (S284) to return "Break Appeal" as the return value of the process (S285).

FIG. 19 is referred to again here. After execution of the appeal continuation judgment process 2 in S274, if the return value is "Keep on Appeal" (S275: Yes), the process will go back to S274 to repeat the aforementioned processes. Meanwhile, if the return value of the appeal continuation judgment process 2 is "Break Appeal" (S275: No), the display image of the display panel 25 will be set back in the state before execution of the informing operation (appeal), so as to terminate the informing operation (appeal) in execution (S276).

Figure 21:
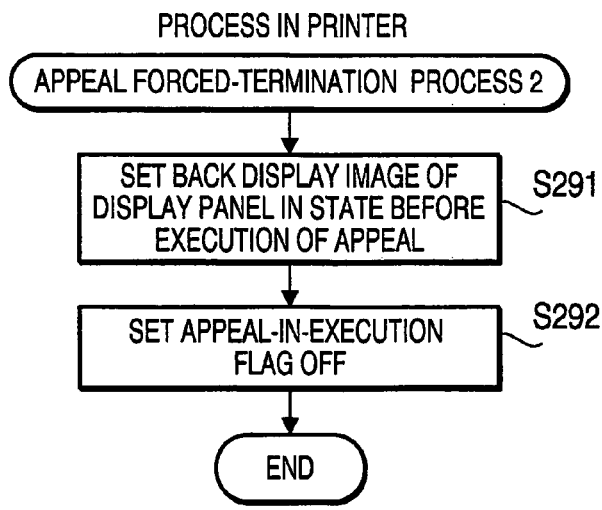
FIG. 21 is a flowchart showing an appeal forced-termination process executed by the printer as the specified device according to at least one aspect of the invention.

FIG. 21 is a flowchart showing an appeal forced-termination process 2. The appeal forced-termination process 2 is a process for forced-terminating the informing operation (appeal) for informing of the location of the printer 20 to be confirmed. The appeal forced-termination process 2 is executed when some sort of error or warning occurs, or the operating keys 24 are operated by the user of the printer 20.

In the appeal forced-termination process 2, the display image of the display panel 25 is set back in the state before execution of the informing operation (appeal) (S291), and the appeal-in-execution flag 23g is set OFF (S292) to forced-terminate the informing operation (appeal) in execution. When some sort of error or warning occurs, or the operating keys 24 are operated by the user of the printer 20, there are displayed on the display panel 25 necessary matters, for instance, on what the current state of the printer 20 is or how the printer 20 is currently operated. As such a case, when the necessary matters, which should be displayed on the panel 25 of the printer 20, occurs, the necessary matters can be displayed by immediately terminating the appeal display as shown in FIG. 13D in the appeal forced-termination process 2.

Figure 17:
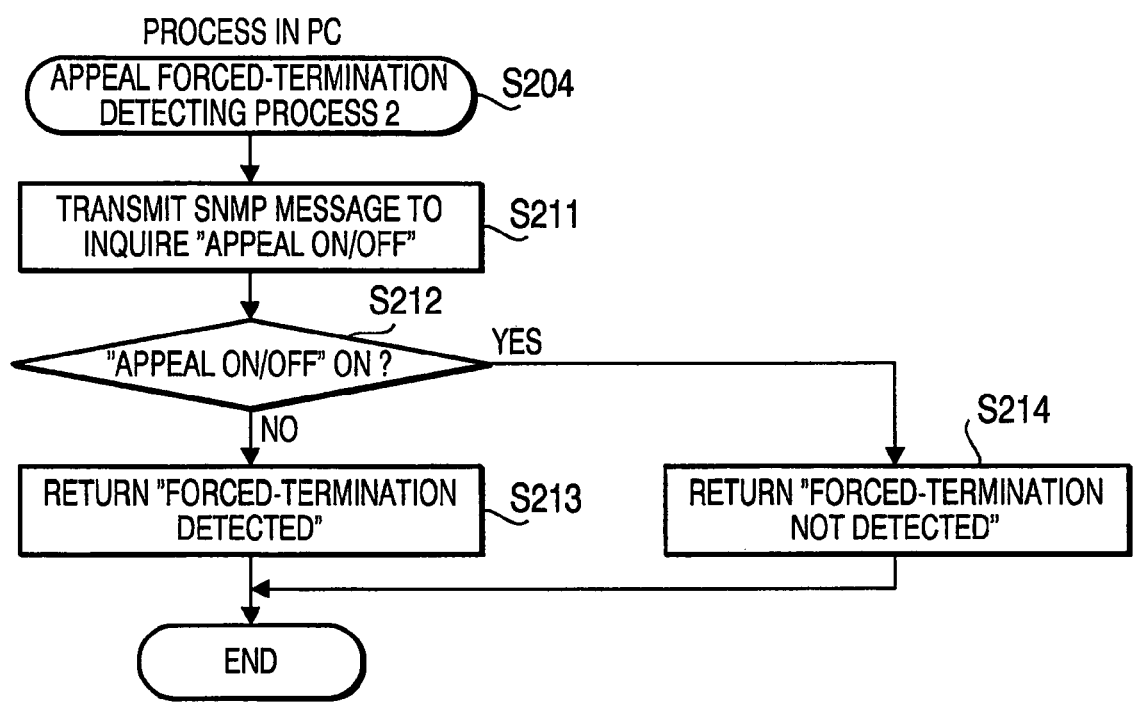
FIG. 17 is a flowchart showing an appeal forced-termination detecting process executed by the PC according to at least one aspect of the invention.

It is noted that, by setting the appeal valid flag 23*f* OFF, the forced-termination of the informing operation (appeal) in the specified device is detected in the appeal forced-termination detecting process 2 (S204), which is executed by the PC 10, shown in FIG. 17. Consequently, the appeal assignment in execution is terminated in the PC 10 (S205 in FIG. 16: Yes).

As mentioned above, according to the network system in aspects of the invention, by changing the display image of the specified device the informing operation (appeal) can be executed for informing of which the specified device displayed on the LCD 16 of the PC 10 is among the printers 20 and/or MFCs 30 connected to the LAN cable 1. Therefore, the user of the PC 10, after giving instructions for the appeal assignment, can confirm the location of the specified device by visually confirming the displays of the printers 20 and MFCs 30. In addition, such an appeal display is shown in the same manner by both of the PC 10 that assigns the informing operation (appeal) and the specified device. Accordingly, even though informing operations (appeals) are executed at the same time by PCs 10, it is allowed to exactly confirm the location of an intended specified device. It is noted that the informing operation (appeal) may be executed not only with a character string and/or background color being displayed, but also with a graphic form, such as an icon, being displayed. Moreover, the display color may be used not as the background color changing the whole display screen, but as a color changing a part of the character color and display screen.

Hereinabove, aspects of the present invention have been explained. However, it is easily to be understood that the present invention is not limited to the above-described aspects, and that various modifications may be made within such a scope.

For example, in at least some aspects, data sending/receiving operations between the management PC 10 that is a host device and the printers 20 and MFCs 30 are carried out using the packet data of the SNMP message and Ping packet data. However, aspects are not so limited to the data sending/receiving operations using such data formats, and may be configured using data sending/receiving operations using other data formats. For instance, other data formats such as HTTP packet data and CMIP packet data can be exemplified.

Each of the values stored in the appeal time-out value memories 23*b* and 33*b*, the appeal display character string memories 23*c* and 33*c*, and the appeal display color memories 23*d* and 33*d* is set based upon the transmitted data from the PC 10. However, in some aspects the informing operation (appeal) may be executed using default values, which are previously set and stored in those memories of the printers 20 and MFCs 30, in the case where no setting is sent from the PC 10.

Further, the informing operation (appeal) may be executed with a buzzer being sounded. By such a configuration, it is possible to confirm the location of an intended printer 20 or MFC 30 more easily.

In at least some aspects, the informing operation (appeal) is executed by the printer 20 as an example of the image I/O (input/output) device. However, the image I/O device that executes the informing operation (appeal) is not limited to the printer 20. The informing operation (appeal) may be executed by the MFC 30, and by any network devices, which are provided with display devices and are to be connected to a network, such as a scanner, facsimile machine, telephone, camera, projector, storage device, multi function device provided with functions of these devices, and multi function device provided with a function of the printer and at least one function of these devices.

In the aspects described above, examples configured on the wired LAN are shown. However, aspects of the present invention are not so limited. Aspects the present invention may be applied to any network, other than the wired LAN, configured with devices connected thereto. For example, in some aspects the present invention may be applied to networks such as a wireless LAN, a network configured in complex with a wired LAN and wireless LAN, and a Bluetooth network.

What is claimed is:

1. A printing device to be connected to a network, which is configured to input and/or output data, comprising:
   a self-address storing system configured to store the printing device address;
   a receiving system configured to receive display assigning data and ping data for visually confirming an actual physical location of the printing device, wherein a destination of the display assigning data and the ping data is an address stored in the self-address storing system, wherein each of the display assigning data and ping data is being transmitted from one or more other devices through the network;
   an integrated displaying system configured to display at least one of a character string and a graphic form;
   an informing execution system configured to:
      determine whether the device transmitting the display assigning data is the same device transmitting the ping data,
      execute an informing operation by changing a display state of the displaying system responsive to determining that the same device transmitted the display assigning data and the ping data, and
      prevent the informing operation responsive to determining that different devices transmitted the display assigning data and the ping data; and
   an informing condition storing system configured to store an informing display condition in response to the receiving system receiving data that assigns the informing display condition,
   wherein the informing execution system is configured to execute the informing operation by changing a display state of the displaying system based upon the informing display condition stored in the informing condition storing system.

2. The printing device according to claim 1, further comprising an informing display condition storing system configured to store an informing display condition, under which the displaying system executes a displaying operation, in response to the receiving system receiving data that assigns the informing display condition,
   wherein the informing execution system is configured to execute the informing operation by changing the display state of the displaying system based upon the informing display condition stored in the informing condition storing system.

3. The printing device according to claim 1, further comprising:
   a sending source address storing system configured to store a first device address of a sending source device that has sent reservation data for making a reservation for visually confirming a physical body of the printing device, in response to the receiving system receiving the reservation data;

an address judging system configured to judge whether a second device address of a sending source device that has sent the display assigning data and the ping data conforms with the first device address stored in the sending source address storing system;

the informing execution system further configured to execute an informing operation in response to the receiving system receiving the display assigning data and the ping data, and the address judging system judges that the first device address of the sending source device which has sent the display assigning data and the ping data conforms to the second device address stored in the sending source address storing system; and an informing condition storing system configured to store an informing display condition in response to the receiving system receiving data that assigns the informing display condition, wherein the informing execution system is configured to execute the informing operation by changing a display state of the displaying system based upon the informing display condition stored in the informing condition storing system.

4. The printing device according to claim 1, wherein the receiving system is configured to receive the data that assigns the informing display condition and the display assigning data and the ping data for visually confirming the physical body of the printing device.

5. The printing device according to claim 1, wherein the data that assigns the informing display condition assigns a color for informing of the physical body of the printing device, and wherein the informing execution system is further configured to execute the informing operation by displaying the assigned color stored in the informing display condition storing system on at least a part of the displaying system.

6. The printing device according to claim 1, wherein the data that assigns the informing display condition assigns at least one of a character string and a graphic form for executing the informing operation, and wherein the informing execution system is configured to execute the informing operation by displaying the assigned one of the character string and the graphic form.

7. The printing device according to claim 1, further comprising:

an informing time measuring system configured to measure an execution time of the informing operation by the informing execution system; and an informing termination system configured to terminate the informing operation executed by the informing execution system, in response to the information measuring system measuring an execution time greater than or equal to a predetermined time.

8. The printing device according to claim 7, wherein the informing time measuring system is configured to start measuring the execution time of the informing operation, in response to the receiving system receiving the display assigning data and the ping data for visually confirming the physical body of the printing device, and wherein the informing time measuring system is configured to restart measuring the execution time of the informing operation from a reset state, in response to the receiving system further receiving the display assigning data and the ping data for visually confirming the physical body of the printing device while the informing time measuring system is measuring the execution of time of the informing operation.

9. The printing device according to claim 1, further comprising:

an operation executing system configured to execute a specified operation;

an execution status displaying system configured to display on the displaying system a status of the execution status displaying system under operation, in response to the operation executing system being executing the specified operation; and an informing non-execution system configured to cause the informing execution system not to execute the informing operation, even though the receiving system receives the display assigning data and the ping data for visually confirming the physical body of the printing device, in response to the execution status displaying system being to display on the displaying system the status of the execution status displaying system under operation.

10. The printing device according to claim 9, further comprising an operating device configured to be operable by a user, wherein the operation executing system is configured to execute the specified operation corresponding to an operation of the operating device, and wherein the execution status displaying system is configured to display on the displaying system a display state corresponding to the operation of the operating device.

11. A printing device to be connected to a network, which is configured to input and/or output data, comprising:

a self-address storing system configured to store the printing device address;

a receiving system configured to receive display assigning data and ping data for visually confirming an actual physical location of the printing device, wherein a destination of the display assigning data and the ping data is an address stored in the self-address storing system, wherein each of the display assigning data and the ping data is being transmitted from one or more other devices through the network;

an integrated displaying system configured to display at least one of a character string and a graphic form;

a confirmation reservation storing system configured to store a reservation for visually confirming a physical body of the printing device, in response to the receiving system receiving reservation data for making the reservation for visually confirming the physical body of the printing device;

a reservation judging system configured to judge whether the reservation for visually confirming the body of the printing device is stored in the confirmation reservation storing system; and an informing execution system configured to:

determine whether the device transmitting the display assigning data is the same device transmitting the ping data, and execute an informing operation in response to determining that the same device transmitted the display assigning data and the ping data and in response to the reservation judging, system determining that the reservation is stored in the confirmation reservation storing system of the printing device, and prevent the informing operation in response to determining that different devices transmitted the display assigning data and the ping data.

12. A computer readable medium having computer-executable instructions stored thereon, the instructions adapted to be executed by an printing device including a displaying system integrated in the printing device that displays at least one of a character string and a graphic form, the printing device being configured to input and/or output data and operate while being connected to a network, the instructions when executed performing a method comprising:

storing a device address of the printing device;

receiving display assigning data and ping data for visually confirming an actual physical location of the printing device, wherein a destination of the display assigning data and the ping data is the device address stored in the printing device, wherein each of the display assigning data and the ping data is being transmitted through the network by one or more other devices;

storing a reservation of visually confirming a physical body of the printing device, in response to reservation data for making the reservation being received in said receiving step;

judging whether the reservation of visually confirming the physical body of the printing device is stored in the printing device;

in response to determining that the reservation is stored in the printing device, determining whether a device transmitting the display assigning data is the same device transmitting the ping data;

informing of a physical body of the printing device by changing a display state of the displaying system, in response to determining that the same device transmitted the display assigning data and the ping data; and preventing the informing of the physical body in response to determining that different devices transmitted the display assigning data and the ping data;

wherein informing of the physical body of the printing device further includes displaying at least one of a character string and a graphic form on the displaying system.

13. A computer readable medium having computer-executable instructions stored thereon, the instructions adapted to be executed by an printing device that is configured to input and/or output data and operate while being connected to a network, the instructions when executed performing a method comprising:

storing a device address of the printing device;

receiving display assigning data and ping data for visually confirming an actual physical location of the printing device, wherein a destination of the display assigning data and the ping data is the device address stored in the printing device, wherein each of the display assigning data and the ping data is being transmitted through the network by one or more other devices;

storing a first device address of a sending source device that has sent reservation data for making a reservation of visually confirming a physical body of the printing device, in response to the reservation data being received in said receiving step;

determining whether a device transmitting the display assigning data is the same device transmitting the ping data;

informing the physical body of the printing device by displaying at least one of a character string and a graphic form on a displaying system integrated in the printing device, in response to determining that the display assigning data and the ping data are transmitted from the same device; and preventing the informing of the physical body in response to determining that the display assigning data and the ping data are transmitted from different devices.

14. A device confirming system, which is configured to confirm a physical body of a printing device configured to input and/or output data, comprising:

a network;

at least one host device connected to the network; and a plurality of printing devices connected to the network, wherein the at least one host device includes:

a first displaying system configured to display at least one of a character string and a graphic form;

a transmitting system configured to transmit data to a specified one of the plurality of printing devices connected to the network;

an operating device configured to be operable by a user; and a confirmation requesting system configured to request transmission, from the transmitting system to the specified one of the plurality of printing devices, confirmation requesting data for requesting a visual confirmation of the physical body of the specified one of the plurality of printing devices, and to display on the first displaying system a display image for informing of a visual confirmation requesting operation for requesting a visual confirmation of the physical body of the specified one of the plurality of printing devices being in execution, in response to the visual confirmation requesting operation being executed with the first operating device being operated by the user, and wherein the printing device includes;

a self-address storing system configured to store the printing device address;

a receiving system configured to receive display assigning data and ping data for visually confirming an actual physical location of the printing device, wherein destination of the display assigning data and the ping data is an address stored in the self-address storing system, wherein each of the display assigning data and the ping data is being transmitted from one or more another other devices through the network;

a second displaying system configured to display at least one of a character string and a graphic form; and an informing execution system configured to:
determine whether a device transmitting the display assigning data is the same device transmitting the ping data,
execute an informing operation by changing a display state of the displaying system responsive to determining that the same device transmitted the display assigning data and the ping data,
prevent the informing operation responsive to determining that different devices transmitted the display assigning data and the ping data;

a confirmation reservation storing system configured to store a reservation for visually confirming a physical body of the printing device, in response to the receiving system receiving reservation data for making the reservation of confirming the physical body of the printing device;

a reservation judging system configured to judge whether the reservation for visually confirming the physical body of the printing device is stored in the confirmation reservation storing system;

the informing execution system further configured to execute an informing operation in response to the receiving system receiving the display assigning data and the ping data, and the reservation judging system judges that the reservation for visually confirming the physical body of the printing device is stored in the confirmation reservation storing system; and an informing condition storing system configured to store an informing display condition in response to the receiving system receiving data that assigns the informing display condition, wherein the informing execution system is configured to execute the informing operation by changing a display state of the displaying system based upon the informing display condition stored in the informing condition storing system.

15. The physical body confirming system according to claim 14, wherein the host device further includes:

a status confirming system configured to instruct the transmitting system to transmit to the specified printing device status confirming data for confirming a status of the specified printing device;

a status displaying system configured to display on the first displaying system the statuses of the printing devices, the statuses being confirmed by the status confirming system; and a selecting system configured to select an printing device whose physical body is to be confirmed among the printing devices whose statuses are displayed on the first displaying system by the status displaying system.

16. The physical body confirming system according to claim 14, wherein the host device further includes an informing condition assigning system configured to instruct the transmitting system to transmit to the specified printing device an informing condition assigning data for assigning an informing display condition that is applied when informing of the physical body of the specified printing device, wherein the confirmation requesting system is configured to display on the first displaying system the display image for informing of the confirmation requesting operation being in execution based upon the informing display condition assigned by the informing condition assigning system, wherein the printing device further includes an informing display condition storing system configured to store the assigned informing display condition in response to the receiving system receiving the informing condition assigning data transmitted from the at least one host device, and wherein the informing execution system is further configured to inform of the physical body of the printing device by changing a display state of the second displaying system based upon the informing display condition stored in the informing display condition storing system.

17. The physical body confirming system according to claim 14, wherein the host device further includes an informing time assigning system configured to instruct the transmitting system to transmit to the specified printing device an informing time assigning data for assigning an informing time during which the informing operation is to be executed, and wherein the printing device further includes:

an informing time storing system configured to store the assigned informing time in response to the receiving system receiving the informing time assigning data;

an informing time measuring system configured to measure an execution time of the informing operation executed by the informing execution system; and an informing termination system configured to terminate the informing operation executed by the informing execution system, in response to the execution time of the informing operation measured by the informing time measuring system being more than the assigned informing time stored in the informing time storing system.

18. The physical body confirming system according to claim 14, wherein the host device further includes:

a status confirming system configured to instruct the transmitting system to transmit to the specified printing device status confirming data for confirming a status of the specified printing device; and a termination warning system configured to warn that the confirmation requesting operation in execution is to be terminated, in response to the status confirming system confirming that the specified printing device is in execution of a predetermined operation during the confirmation requesting operation being executed by the confirmation requesting system.

19. The physical body confirming system according to claim 14, wherein the host device further includes:

an operation assigning system configured to instruct the transmitting system to transmit to the specified printing device an operation assigning data for assigning a predetermined operation, when the specified printing device is assigned to execute the predetermined operation with the operating device; and a termination inducing display system configured to display on the first displaying system a display state for inducing termination of the confirmation requesting operation being executed by the specified printing device, which is assigned to execute the predetermined operation by the operation assigning system.

20. The physical body confirming system according to claim 14, wherein the host device further includes:

an operation assigning system configured to instruct the transmitting system to transmit to the specified printing device an operation assigning data for assigning a predetermined operation, in response to the specified printing device being assigned to execute the predetermined operation with the operating device being operated by the user; and a confirmation terminating system configured to control the transmitting system to transmit confirmation terminating data for terminating visual confirmation of the physical body of the specified printing device to the specified printing device that is assigned to execute the predetermined operation with the operating device being operated by the user, and to set back a display state of the first displaying system in a state before execution of the confirmation requesting operation.

21. The physical body confirming system according to claim 14, wherein the host device further includes a confirmation terminating system configured to instruct the transmitting system to transmit to the specified printing device confirmation terminating data for terminating visual confirmation of the physical body of the specified printing device, and set back a display state of the first displaying system in a state before execution of the confirmation requesting operation, in response to the confirmation requesting system being assigned to terminate the confirmation requesting operation with the operating device being operated by the user, and wherein the printing device further includes an informing termination system configured to terminate the informing operation by setting back a display state of the second displaying system in a state before execution of the informing operation, in response to the receiving system receiving the confirmation terminating data transmitted from the host device.

22. The printing device of claim 1, wherein the informing execution system is configured to execute an informing operation by changing a display state of the displaying system until the receiving system receives an informing operation termination command, in response to the receiving system receiving data for visually confirming the physical body of the printing device.

23. The printing device of claim 1, further comprising:
a confirmation reservation storing system configured to store a reservation for visually confirming a physical body of the printing device, in response to the receiving system receiving reservation data for making the reservation of visually confirming the actual, physical location of the printing device; and
a reservation judging system configured to judge whether the reservation for visually confirming actual, physical location of the printing device is stored in the confirmation reservation storing system;

the informing execution system further configured to execute an informing operation in response to the receiving system receiving the display assigning data and ping data, and the reservation judging system judging that the reservation for visually confirming the actual physical location of the printing device is stored in the confirmation reservation storing system.

24. The printing device of claim 1, wherein the informing execution system is further configured to:
determine whether the informing operation is allowed to be executed in response to determining that the device transmitting the display assigning data is the same device transmitting the ping data, wherein determining whether the information operation is allowed to be executed is performed based on a flag; and
in response to determining that the informing operation is allowed to be executed, reset a time-out counter defining a time since a last execution of the informing operation.

25. The printing device of claim 24, wherein the informing execution system is further configured to:
transmit an indication that the flag has been set to disallow execution of the informing operation in response to determining that the time-out counter exceeds a predefined time-out value defining an amount of time between consecutive informing operations.

* * * * *